(12) United States Patent
Shi et al.

(10) Patent No.: US 8,259,751 B2
(45) Date of Patent: Sep. 4, 2012

(54) BANDWIDTH-ALLOCATING DEVICE AND METHOD

(75) Inventors: Ying Shi, Beijing (CN); Hiroki Ikeda, Hachioji (JP); Hideya Yoshiuchi, Beijing (CN)

(73) Assignee: Hitachi, Ltd., Tokyo (JP)

( * ) Notice: Subject to any disclaimer, the term of this patent is extended or adjusted under 35 U.S.C. 154(b) by 235 days.

(21) Appl. No.: 12/037,538

(22) Filed: Feb. 26, 2008

(65) Prior Publication Data

US 2008/0205443 A1      Aug. 28, 2008

(30) Foreign Application Priority Data

Feb. 28, 2007   (CN) .......................... 2007 1 0084383

(51) Int. Cl.
*H04J 3/16*           (2006.01)
(52) U.S. Cl. ...................................................... 370/468
(58) Field of Classification Search .................... 370/468
See application file for complete search history.

(56) References Cited

U.S. PATENT DOCUMENTS

| | | | |
|---|---|---|---|
| 6,967,949 B2 * | 11/2005 | Davis et al. ................... | 370/390 |
| 2003/0123482 A1 * | 7/2003 | Kim et al. ..................... | 370/468 |
| 2006/0233197 A1 * | 10/2006 | Elmoalem et al. ............ | 370/468 |
| 2007/0071031 A1 * | 3/2007 | Shin et al. ..................... | 370/468 |
| 2007/0133989 A1 * | 6/2007 | Kim et al. ....................... | 398/69 |
| 2008/0205443 A1 * | 8/2008 | Shi et al. ....................... | 370/468 |
| 2008/0298234 A1 * | 12/2008 | Ishikawa et al. .............. | 370/230 |
| 2009/0252494 A1 * | 10/2009 | Capurso et al. ................ | 398/58 |

FOREIGN PATENT DOCUMENTS

| | | |
|---|---|---|
| JP | 2003078561 | 3/2003 |
| JP | 2003264588 | 9/2003 |

OTHER PUBLICATIONS

ITU-T G. 983.4 Appendix I (Nov. 2001).
H. Mukaiyama, et al "A Sturdy of ATM-PON with Dynamic Bandwidth Allocation Technique for Various Service Categories", Technical Report of IEICE, CS2001-20, OCS2001-13, pp. 19-24, May 17, 2001.
Y. Luo et al "Bandwidth Allocation for Multiservice Access on EPONS", Communication Magazine, IEEE, vol. 43, Issue 2, Feb. 2005, pp. S16-S21.

* cited by examiner

*Primary Examiner* — Anh-Vu Ly
*Assistant Examiner* — Christopher R Crompton
(74) *Attorney, Agent, or Firm* — Brundidge & Stanger, P.C.

(57) ABSTRACT

In the bandwidth-allocating method of the present invention for PON (: Passive Optical Network), a bandwidth is allocated from an optical line terminal to each optical network unit. The optical line terminal stores a bandwidth contract table for indicating a correspondence relationship between communication flow IDs and service quality parameters, each communication flow ID identifying each communication flow between the optical line terminal and each optical network unit. The bandwidth-allocating method includes a step of transmitting a service-quality request message including the communication flow IDs and the service quality parameters from each optical network unit to the optical line terminal, and a step of the optical line terminal's updating the bandwidth contract table based on the service quality parameters, and performing the bandwidth allocation to a communication flow specified by the corresponding communication flow ID based on the bandwidth contract table.

12 Claims, 18 Drawing Sheets

FIG. 18

| T-CONT IDENTIFIER (Alloc-ID) | T-CONT TYPE | Group-ID | FB QUEUE LENGTH (OPTION) | AB+Non-AB+BE QUEUE LENGTH |
|---|---|---|---|---|
| 0x1 | Type1 | NA | 5k | 0 |
| 0x2 | Type3 | 200 | 0 | 20k |
| 0x3 | Type3 | 200 | 0 | 15000k |
| 0x4 | Type3 | 201 | 0 | 41000k |
| 0x5 | Type3 | 200 | 0 | 50k |
| 0x6 | Type5 | NA | 3k | 20000k |

FIG. 19

| Group-ID | T-CONT IDENTIFIER (Alloc-ID) | GROUP CONTRACT | | |
| --- | --- | --- | --- | --- |
| | | FB | AB | GROUP BANDWIDTH LIMITATION (GBL) |
| 200 | 0x2 | 0 | 20M | 24M |
| 200 | 0x3 | 0 | 20M | 24M |
| 200 | 0x5 | 0 | 20M | 24M |
| 201 | 0x4 | 0 | 30M | 40M |

FIG. 21

| PRIORITY LEVEL | T-CONT IDENTIFIER (Alloc-ID) | UAmt | GROUP CONTRACT | | BANDWIDTH LIMITATION |
| --- | --- | --- | --- | --- | --- |
| | | | FB | AB | |
| H | 0x1 | 3 | 30M | 30M | 120M |
| M | 0x2 | 3 | 15M | 30M | 60M |
| L | 0x3 | 2 | 0M | 20M | 30M |

BANDWIDTH-ALLOCATING DEVICE AND METHOD

INCORPORATION BY REFERENCE

The present application claims priority from Chinese application CNP200710084383.5 filed on Feb. 28, 2007, the content of which is hereby incorporated by reference into this application.

BACKGROUND OF THE INVENTION

1. Field of the Invention

The present invention relates to PON (: Passive Optical Network), and more particularly to DBA (: Dynamical Bandwidth Allocation) in PON.

2. Description of the Related Art

In accompaniment with the rapid development of optical-access-network technologies, the PON technology has widely been applied due to its wide bandwidth, high efficiency, and quality-of-service (: QoS) guarantee. Conventionally, in the PON system, a downstream frame has been broadcasted, and a certain specific identifier is checked to perform filtering of the downstream frame. Here, in an OLT (: Optical Line Terminal), an upstream frame is allocated to each user based on a bandwidth request from each user and SLA (: Service Level Agreement). Moreover, in the OLT, algorithms used for the bandwidth allocation may be DBA (: Dynamical Bandwidth Allocation) algorithms as well as SBA (: Static Bandwidth Allocation) algorithms.

However, when the bandwidth-allocating algorithms are the SBA algorithms, a fixed bandwidth is allocated to each ONU (: Optical Network Unit). This fixed allocation gives rise to occurrence of a waste of the communications band. Accordingly, in the actual system, research and application are widely carried out on the DBA algorithms to obtain flexible bandwidth allocation and bandwidth statistical gain.

In some of the DBA algorithms, however, the bandwidth is allocated to one or a few "busy users" unlimitedly (or in a manner of being limited to the line rate) up to an extent at which the system performance is degraded significantly. For example, in the conventional technology of ITU-T G. 983. 4 Appendix I, the bandwidth is allocated by calculating a transmission-await data amount on link route of PON. The following steps are periodically executed with respect to each communication flow:

1. Each ONU monitors queue length of each communication flow stored in a buffer. Simultaneously, the OLT calculates bandwidth allocation based on queue information that the OLT had received before that, then transmitting the bandwidth allocation;

2. Each ONU receives the bandwidth allocation from the OLT;

3. Each ONU transmits data and the queue-length information based on the bandwidth allocation that each ONU has received.

The bandwidth-allocating algorithm at the above-described step 1 further includes the following steps:

1.1. allocating a fixed bandwidth;

1.2. allocating an assured bandwidth;

1.3. allocating a non-assured bandwidth to all of "congestion users" in proportion to the assured bandwidth of each user;

1.4. checking and assuring that the bandwidth allocated has not exceeded an individual bandwidth limitation;

1.5. allocating a best-effort bandwidth finally.

At the steps 1.2 and 1.3, the unused bandwidth is reused at the next step. Namely, one user's assured bandwidth may also be reused as another user's non-assured bandwidth or best-effort bandwidth. At the step 1.4, the bandwidth allocation to each user is limited by the individual bandwidth limitation. This mechanism allows prevention of the resource's excessive occupation by the "busy users". In the case of a group-based service (e.g., video conference), however, service amount of a particular user is large within the group in many cases. Namely, it is unlikely that all of users within the group are the "congestion users". Accordingly, in the conventional bandwidth-allocating methods where the group factor is not taken into consideration, the bandwidth-allocating efficiency is not high.

Also, in the conventional DBA mechanism, since each ONU can transmit only the bandwidth request to the OLT, the OLT cannot acquire information other than the queue-length information from each ONU. Consequently, the bandwidth contract for each user must be set in advance, or must be set from the OLT. As a result, the low efficiency cannot be avoided in the case where a service change occurs on the user side.

SUMMARY OF THE INVENTION

In view of the above-described technological problems, the present invention has been devised. Accordingly, an object of the present invention is to provide a bandwidth-allocating method and a device therefore for enhancing the efficiency at the time when a service in the PON system, a group service in particular, changes dynamically.

In a bandwidth-allocating method of the present invention, a bandwidth is allocated from an OLT to each ONU. The OLT stores therein a bandwidth contract table for indicating a correspondence relationship between communication flow IDs and service quality parameters. The bandwidth-allocating method includes steps of transmitting a service-quality request message from each ONU to the OLT, the service-quality request message including each communication flow ID for identifying each communication flow between the OLT and each ONU, and the service quality parameters, and the OLT updating the bandwidth contract table based on the service quality parameters, and performing the bandwidth allocation to a communication flow specified by the corresponding communication flow ID based on the bandwidth contract table.

According to the bandwidth-allocating method of the present invention, the OLT acquires the service-quality request information from each user, and performs the bandwidth allocation based on the service-quality request information. This makes it possible to cause each user to dynamically co-use the bandwidth limitation. As a result, it becomes possible to cause the OLT-equipped PON system to have a capability of providing a flexible and appropriate mechanism of a non-assured bandwidth allocation among the users of different assured bandwidth parameters. Simultaneously, it becomes possible to further enhance the efficiency of the system in a group-based application.

Also, in the above-described technology, as a preferred embodiment, the service quality parameters are group ID which defines one of the communication flows, and the group bandwidth limitation imposed on each group ID.

Also, in the above-described technology, as a preferred embodiment, the service-quality request message includes operation IDs which define creation or deletion of a group. Based on the operation IDs included in the service quality parameters, the OLT updates the bandwidth contract table by creating or deleting the group.

Also, in the above-described technology, as a preferred embodiment, the service-quality request message includes group IDs and operation IDs which define join/leave into/from a user group by user. Based on the group IDs and the operation IDs included in the service quality parameters, the OLT adds or deletes the communication flow specified by the communication flow ID within the group IDs, thereby updating the bandwidth contract table.

Also, in the above-described technology, as a preferred embodiment, the service-quality request message includes a communication priority. In the communication priority, a plurality of terminals perform communications with the ONUs by the same communication flow ID and bandwidth limitation.

Also, in the above-described technology, as a preferred embodiment, the service-quality request message includes operation IDs which define an increase or decrease in the number of the plurality of terminals. Based on the operation IDs included in the service quality parameters, the OLT updates the bandwidth contract table by increasing or decreasing the number of the plurality of terminals corresponding to the communication flow IDs and the communication priority.

Also, in the above-described technology, as a preferred embodiment, when performing the bandwidth allocation, the OLT checks whether or not sum of allocations of all assured bandwidth and all non-assured bandwidth in one group is smaller than a group bandwidth limitation of the group. Then, if the sum of the assured bandwidth and the non-assured bandwidth of the group has exceeded the group bandwidth limitation, the OLT sets the total bandwidth of the group at the group bandwidth limitation. Moreover, the OLT newly calculates non-assured bandwidth in proportion to an assured bandwidth parameter of each user in the group.

Also, a bandwidth-allocating device of the present invention is an OLT connected to a plurality of ONUs. The OLT includes a network interface for receiving a service-quality request message from each ONU connected to the OLT, the service-quality request message including each communication flow ID for identifying each communication flow between the OLT and each ONU, and service quality parameters, a memory unit for storing a bandwidth contract table for indicating a correspondence relationship between the communication flow IDs and the service quality parameters, and a control unit for updating the bandwidth contract table based on the service quality parameters included in the service-quality request message, and performing the bandwidth allocation to communication flows specified by the corresponding communication flow IDs based on the bandwidth contract table.

According to the bandwidth-allocating method of the present invention, the OLT acquires the service-quality request information from each user, and performs the bandwidth allocation based on the service-quality request information. This makes it possible to cause each user to dynamically co-use a bandwidth limitation. As a result, it becomes possible to cause the OLT-equipped PON system to have a capability of providing a flexible and appropriate mechanism of an non-assured bandwidth allocation among the users of different assured bandwidth parameters. Simultaneously, it becomes possible to further enhance the efficiency of the system in a group-based application.

Other objects, features and advantages of the invention will become apparent from the following description of the embodiments of the invention taken in conjunction with the accompanying drawings.

BRIEF DESCRIPTION OF THE DRAWINGS

FIG. 18 is a diagram for illustrating a bandwidth request table of the OLT according to the third embodiment of the present invention;

FIG. 19 is a diagram for illustrating the bandwidth request table for recording group contract parameters in the OLT according to the third embodiment of the present invention;

FIG. 21 is a diagram for illustrating a bandwidth contract table for recording the user amount of each priority in the OLT according to the fourth embodiment of the present invention.

DESCRIPTION OF THE INVENTION

Figure 1:
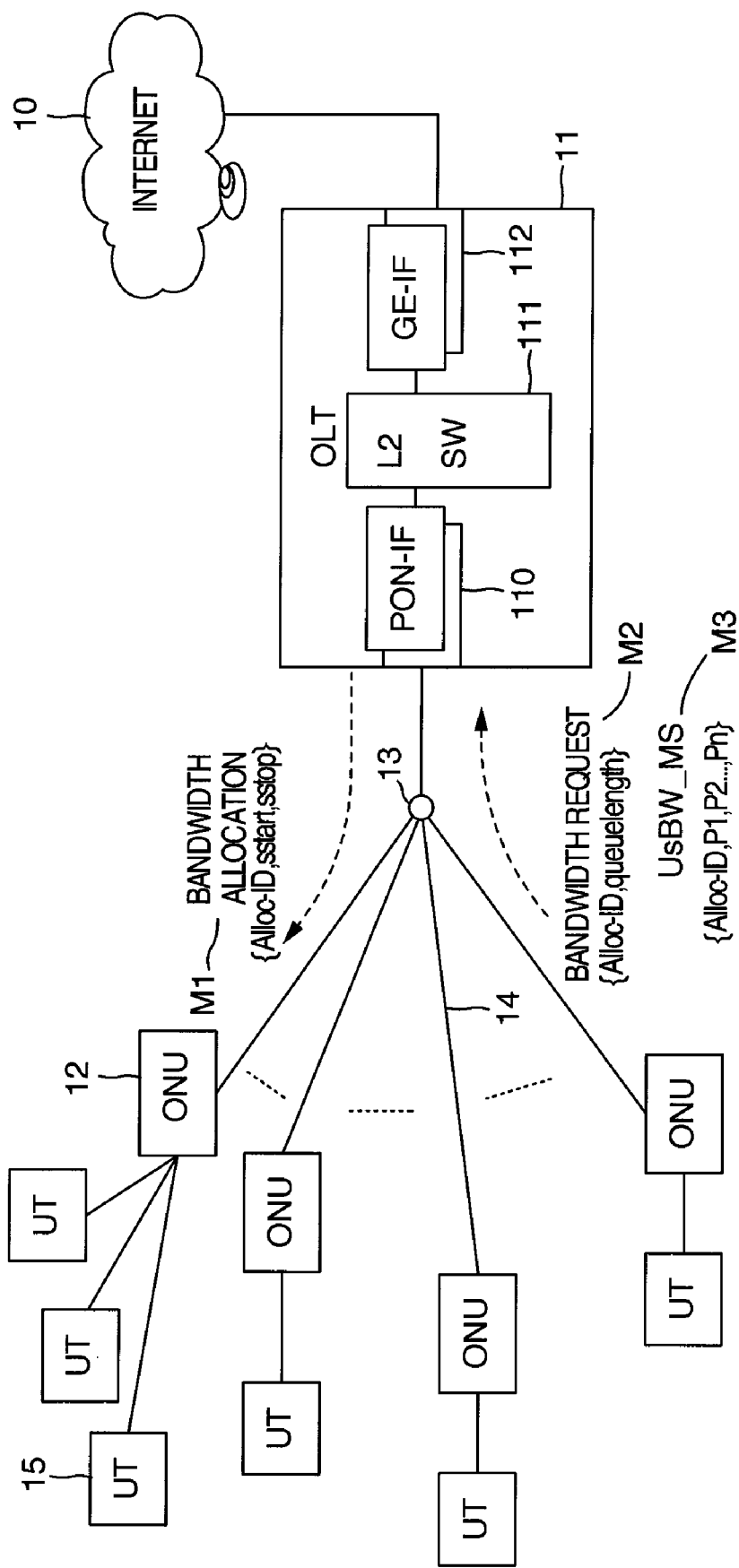
FIG. 1 is a principle diagram for illustrating a PON system having a service-quality request message according to a first embodiment of the present invention.

Hereinafter, referring to the drawings, the detailed explanation will be given below concerning embodiments of the present invention. Incidentally, with respect to functions and configuration with which technicians (those skilled in the art) of the present field are quite familiar, and which will be cited hereinafter, the detailed explanation thereof will be omitted. This is because the functions and configuration are the publicly-known already-existing technologies, and are not substantial contents of the present invention.

1ST EMBODIMENT

FIG. 1 is a principle diagram for illustrating a passive optical network (PON) system having a service-quality request message. The PON system includes an optical line terminal (hereinafter, referred to as "OLT") 11, optical network units (hereinafter, referred to as "ONUs") 12, and user terminals (hereinafter, referred to as "UTs") 15. The ONUs 12 are connected to the OLT 11 via a tree-topology optical splitter 13 and optical fibers 14. Here, the OLT 11 includes a PON interface (hereinafter, referred to as "PON-IF") 110, a layer 2 switch (L2SW) 111, and a Gigabit Ethernet interface (GE-IF) 112.

The OLT 11 transmits, in the downstream direction, a bandwidth (BW)-allocating message M1 to each ONU 12, thereby making it possible to allocate a bandwidth thereto. Each ONU 12 transmits, in the upstream direction, a bandwidth requesting message M2 to the OLT 11 via the optical splitter 13 and each optical fiber 14, thereby making it possible to request the bandwidth and an upstream bandwidth message (UsBW_MS) M3 as a service-quality request to the OLT 11.

Figure 2:
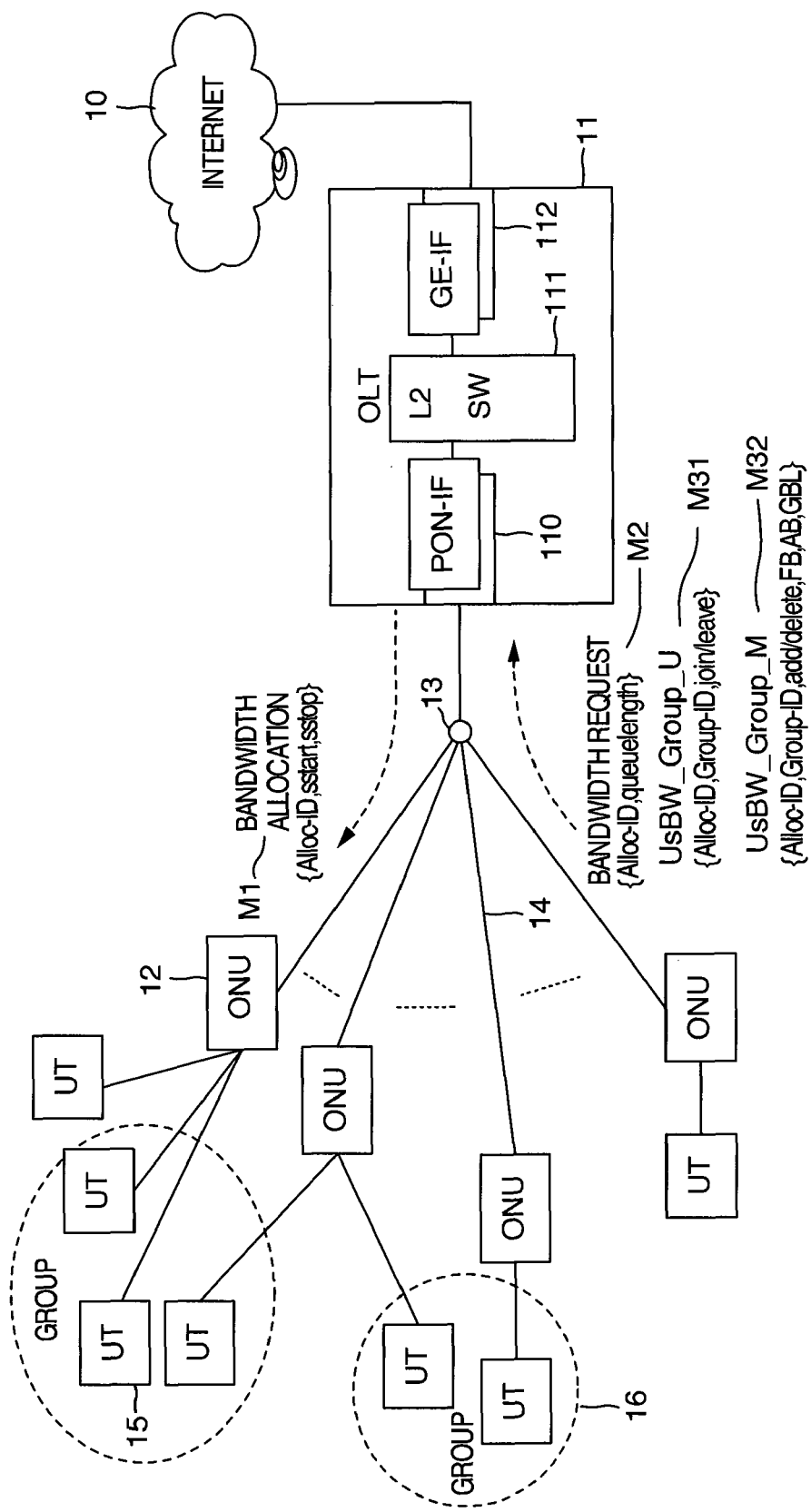
FIG. 2 is a principle diagram for illustrating the PON system having a group bandwidth allocation according to the first embodiment of the present invention.

FIG. 2 is a principle diagram for illustrating the PON system having group bandwidth allocation. In FIG. 2, the PON system includes the OLT 11, each ONU 12, and the user terminals 15. Here, the OLT 11 includes the PON-IF 110, the L2SW 111, and the GE-IF 112 connected to the Internet 10. Each ONU 12 is connected to the OLT 11 via the tree-topology optical splitter 13 and each optical fiber 14. The user terminals 15 may be partitioned into different groups 16.

The OLT 11 transmits, in the downstream direction, the bandwidth-allocating message M1 to each ONU 12, thereby making it possible to allocate a bandwidth thereto. Each ONU 12 transmits, in the upstream direction, the bandwidth-requesting message M2 to the OLT 11 via the optical splitter 13 and each optical fiber 14, thereby making it possible to request the bandwidth and an UsBW_Group_U message M31 for indicating a notification of join/leave into/from a group, and an UsBW_Group_M message M32 for indicating a notification of addition/deletion of a group.

Figure 4:
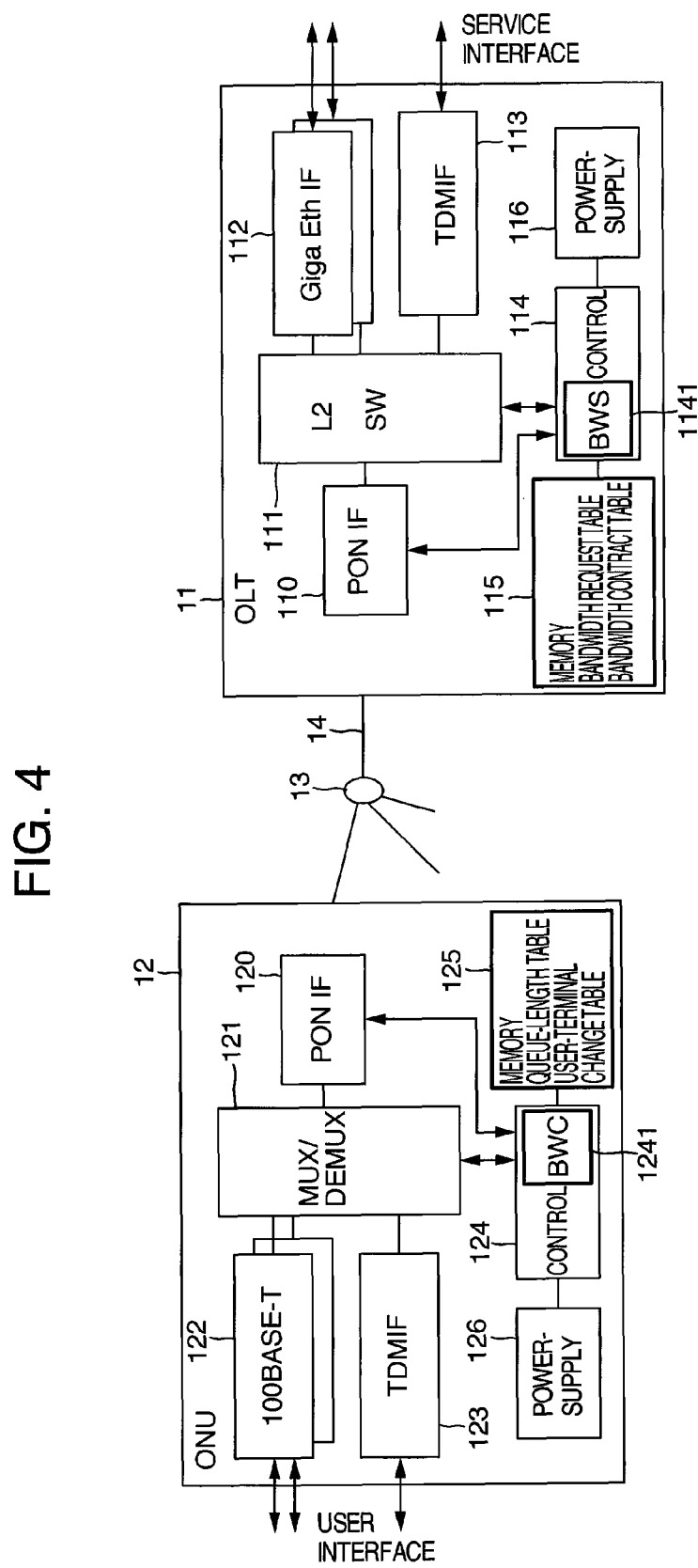
FIG. 4 is a block diagram for illustrating configuration of each ONU and the OLT and their mutual connection according to the first embodiment of the present invention.

FIG. 4 is a block diagram for illustrating configuration of each ONU 12 and the OLT 11 and their mutual connection. In FIG. 4, the OLT 11 includes the PON-IF 110 used for manipulations such as signal transmission/reception, framing/extraction, and bandwidth allocation, the Gigabit Ethernet interface (hereinafter, referred to as "GE-IF") 112 used for communications with the service side by Ethernet, a Time Division Multiplexing interface (hereinafter, referred to as "TDM-IF") 113 used for communications with the service side by time division multiplexing, the L2SW 111 connected to the GE-IF 112, the TDM-IF 113, and the PON-IF 110, and used for cross-connection of the GE-IF 112, the TDM-IF 113, and the PON-IF 110, a control (hereinafter, referred to as "Ctrl") unit 114 including a bandwidth scheduler (hereinafter, referred to as "BWS") 1141 used for reception of each user's bandwidth request and bandwidth allocation to each user, a memory 115 including a bandwidth request table for storing each user's bandwidth request and a bandwidth contract table for storing each user's bandwidth contract information, and a power-supply unit 116.

Meanwhile, each ONU 12 includes a PON-IF 120 used for manipulations such as signal transmission/reception, framing/extraction, and bandwidth allocation, a 100BAST-T interface 122 used for communications with the service side by the Ethernet, a TDM-IF 123 used for communications with the service side by time division multiplexing, a multiplexer/demultiplexer (hereinafter, referred to as "MUX/DEMUX") 121 connected to the 100BAST-T interface 122, the TDM-IF 123, and the PON-IF 120, and used for performing multiplexing/demultiplexing with respect to the 100BAST-T interface 122, the TDM-IF 123, and the PON-IF 120, a control unit 124 including a bandwidth controller (hereinafter, referred to as "BWC") 1241 used for transmitting the UsBW_MS message and each user's bandwidth request, a memory 125 including a queue-length table for storing each queue length and a user-terminal change table for storing change information on the user terminals 15, and a power-supply unit 126.

Also, the PON-IF 110 of the OLT 11 is connected to the PON-IF 120 of each ONU 12 via the tree-topology optical splitter 13 and each optical fiber 14.

Figure 5:
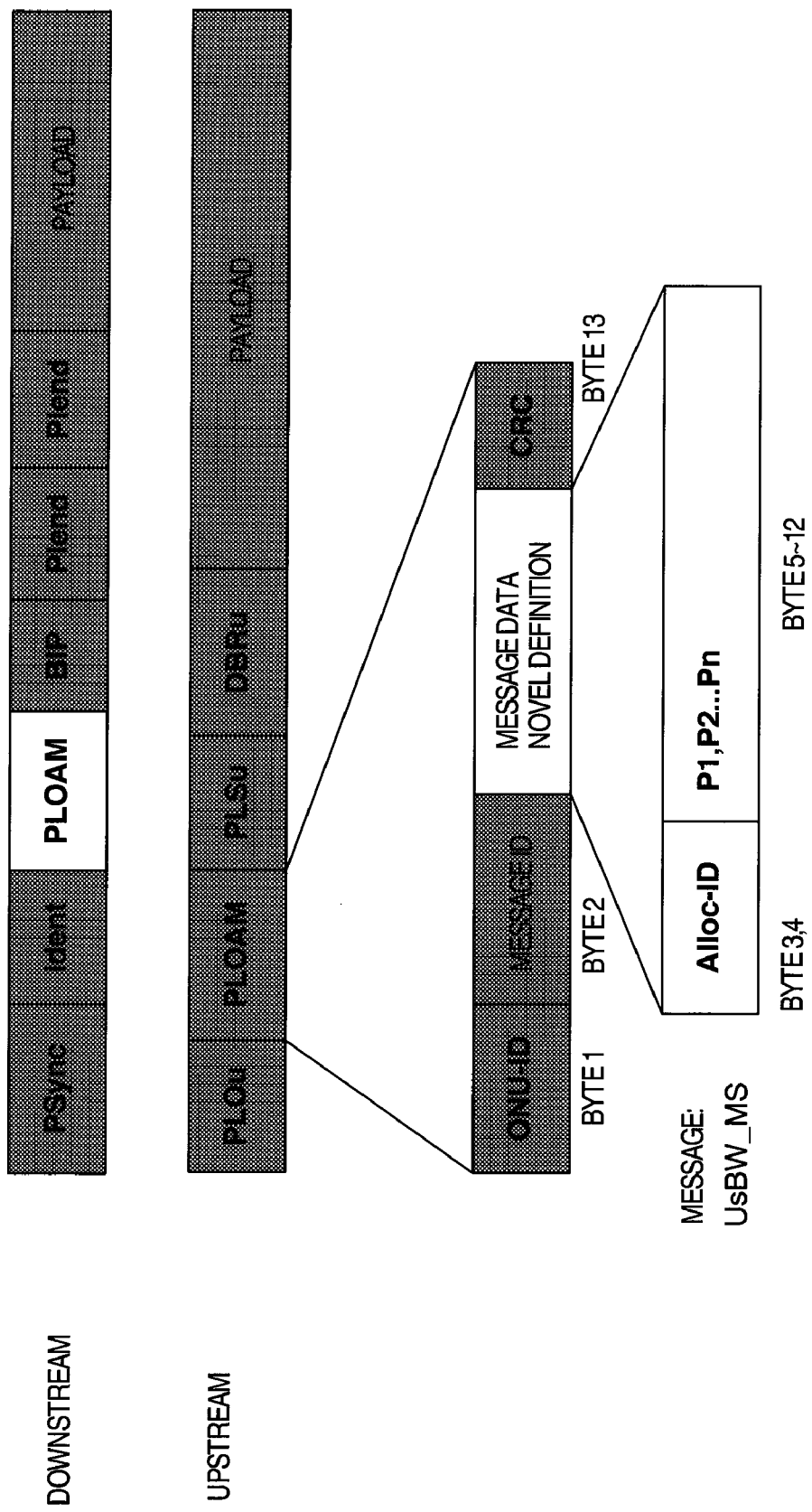
FIG. 5 is a frame configuration diagram for illustrating an UsBW_MS message from each ONU to the OLT according to the first embodiment of the present invention.

Hereinafter, the concrete explanation will be given below regarding the UsBW_MS message in the group bandwidth allocation. FIG. 5 is a frame configuration diagram for illustrating the UsBW_MS message. The UsBW_MS message is transmitted as message data of US-frame PLOAM (: Physical Layer Operations, Administration and Maintenance), and is distinguished by message ID (such as, e.g., 00001010 or 00001011). In particular, the UsBW_MS message includes Alloc-ID (: Allocation Identifier, 2 bytes) for identifying user connection, the other parameters (P1, P2, . . . , Pn, 0 to 8 bytes), and undefined patch (0 to 8 bytes), thus becoming equal to 10-byte length in total. The UsBW_MS is specifically defined as each parameter to be used within the UsBW_MS. For example, the UsBW_MS is defined as the UsBW_Group_U, the UsBW_Group_M, or the UsBW_UAmtC_U.

Hereinafter, referring to frame configurations illustrated in FIG. 6 and FIG. 7, the detailed explanation will be given below concerning the UsBW_Group_U and the UsBW_Group_M, respectively.

Figure 6:
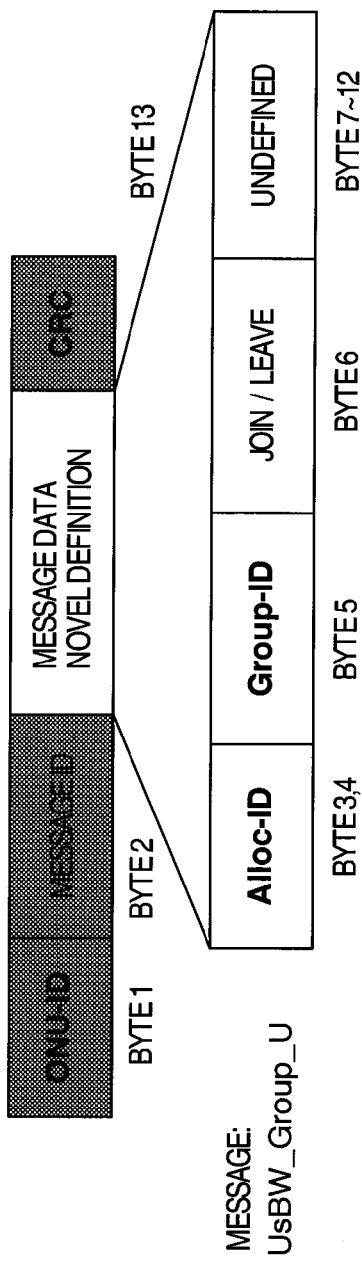
FIG. 6 is a frame configuration diagram for illustrating an UsBW_Group_U message from each ONU to the OLT according to the first embodiment of the present invention.

FIG. 6 is a frame configuration diagram for illustrating the UsBW_Group_U message. The UsBW_Group_U message is transmitted as message data of the US-frame PLOAM, and is distinguished by message ID (e.g., 00001010). In particular, the UsBW_Group_U message includes Alloc-ID (2 bytes) for identifying user connection, Group-ID (1 byte) for identifying group, join/leave (1 byte) for identifying join/leave operation, and 6-byte patch, thus becoming equal to 10-byte length in total.

Figure 7:
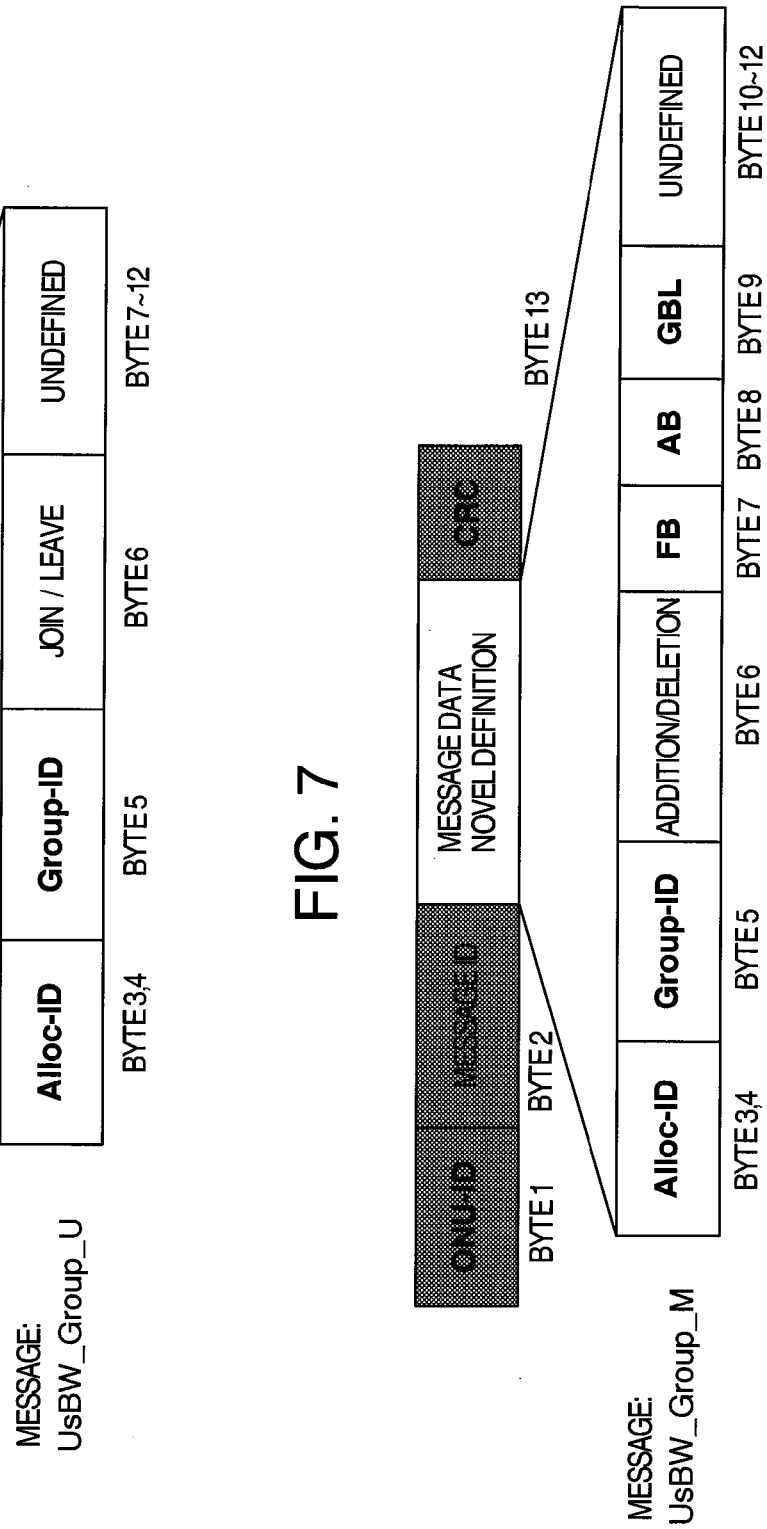
FIG. 7 is a frame configuration diagram for illustrating an UsBW_Group_M message from each ONU to the OLT according to the first embodiment of the present invention.

FIG. 7 is a frame configuration diagram for illustrating the UsBW_Group_M message. In particular, the UsBW_Group_M message includes Alloc-ID (2 bytes) for identifying user connection, Group-ID (1 byte) for identifying group, addition/deletion (1 byte) for identifying addition/deletion operation, FB/AB/GBL (: fixed-bandwidth/assured-bandwidth/group-bandwidth limitation, 1 byte each) for identifying bandwidth-allocation group contract, and 3-byte patch, thus becoming equal to 10-byte length in total.

Figure 10:
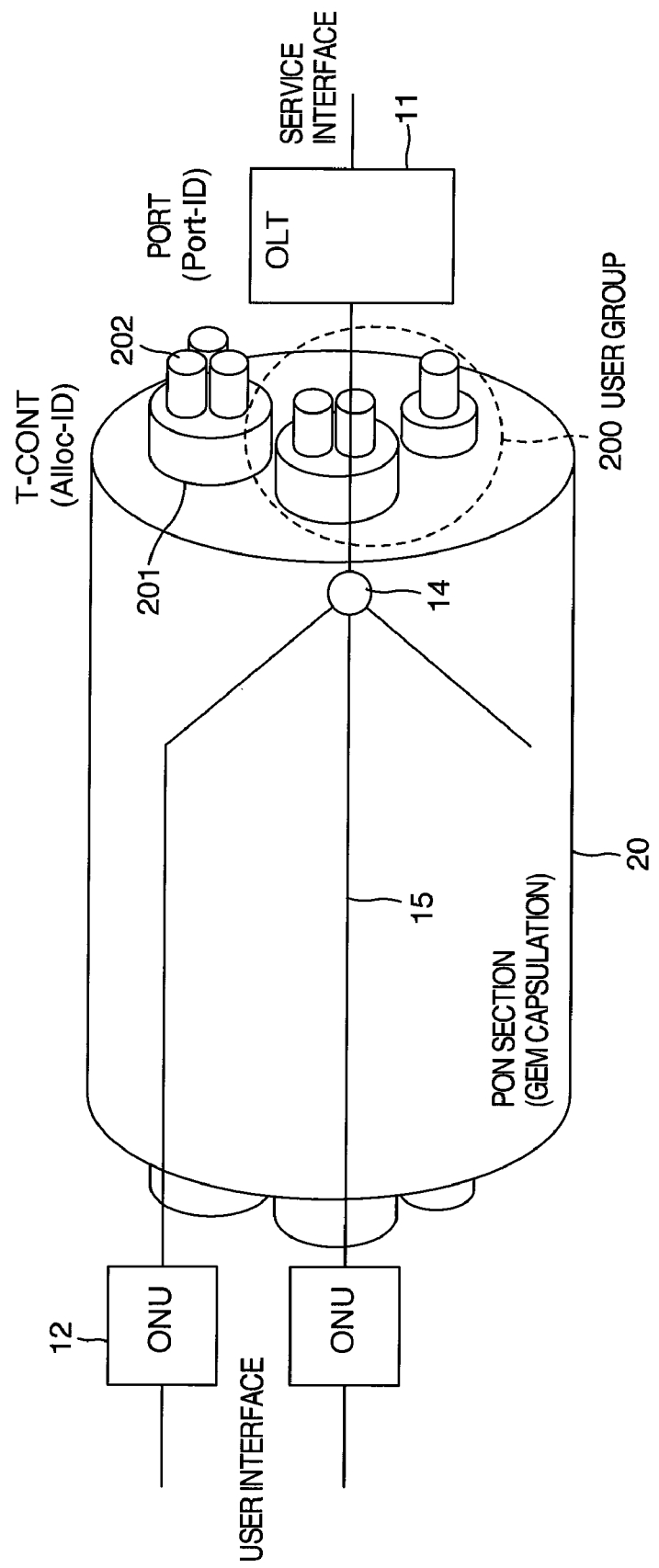
FIG. 10 is a principle diagram for illustrating T-CONT (: Transmission Container) group of the group bandwidth allocation of the PON section according to the first embodiment of the present invention.

Hereinafter, referring to FIG. 10, the in-principle explanation will be given below regarding T-CONT (: Transmission Container) group of the group bandwidth allocation of the PON section. In FIG. 10, the PON section 20 is defined as a communication channel between the OLT 11 and each ONU 12. The PON section 20 is partitioned into T-CONTs 201 by, e.g., GEM (: Gigabit PON Encapsulation Method). All the T-CONTs 201 are partitioned by Alloc-IDs (: Allocation Identifiers), and further are partitioned into different routes 202 partitioned by Port-IDs (: Port Identifiers). According to ITU-T Standard G. 984. 3, the T-CONTs 201 are basic units of the bandwidth allocation. In the first embodiment of the present invention, instead of the T-CONTs 201, some T-CONTs are banded into a user group 200, then being used for the bandwidth allocation.

Hereinafter, based on the concrete types of the UsBW_MS message, the analysis will be carried out with respect to the process of the group bandwidth allocation.

Figure 12:
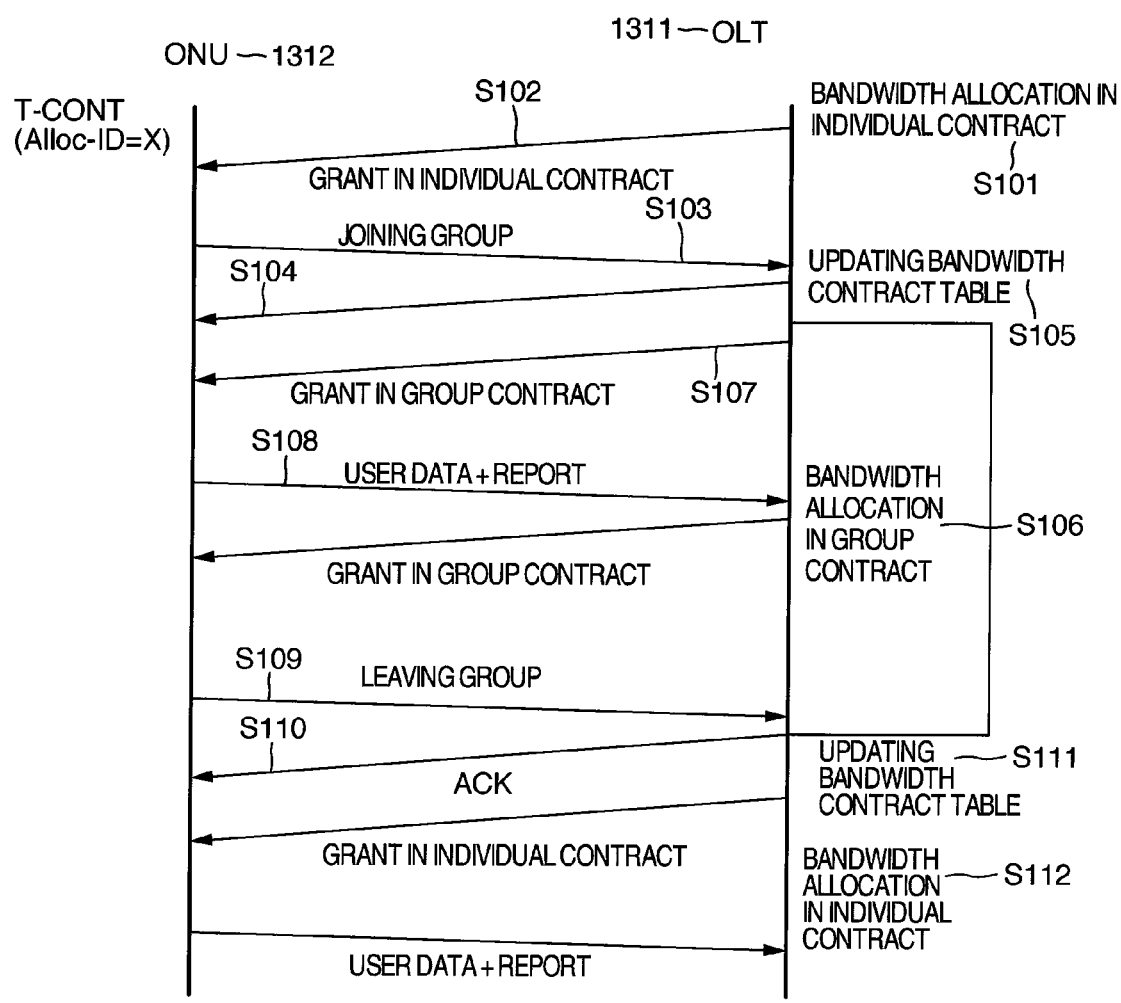
FIG. 12 is a flow diagram for illustrating a process of the join/leave into/from a user group by user and its bandwidth allocation according to the first embodiment of the present invention.

FIG. 12 illustrates a process of the join/leave into/from a user group by user and the corresponding bandwidth allocation. In FIG. 12, the explanation will be given below, selecting operations of an OLT 1311 and an ONU 1312 as the example. First, before the ONU 1312 has joined any one of groups, the OLT 1311 allocates the bandwidth to the ONU 1312 in the individual contract in the conventional technologies (step S101, refer to Non-Patent Document: ITU-T G. 983. 4 Appendix I), then transmitting a grant in the individual contract to the ONU 1312 (step S102). When a user takes advantage of a group service, first, the ONU 1312 transmits the UsBW_Group_U message to the OLT 1311 (refer to the message configuration in FIG. 6), thereby notifying the OLT 1311 of the join into the group by the user (step S103). Moreover, the OLT 1311 transmits an ACK (: acknowledge) message corresponding thereto (step S104), then updating the bandwidth contract table (step S105). After that, the OLT 1311 allocates the bandwidth to the ONU 1312 in group contract (step S106, refer to a detailed flow diagram in FIG. 16). During a time-interval in the group contract, when the OLT 1311 requests the ONU 1312 to transmit a report or the OLT 1311 receives the request from the ONU 1312 (step S108), the OLT 1311 transmits a grant in the group contract (step S107). The OLT 1311 maintains communications with the ONU 1312 in the group contract until the ONU 1312 has left the group by transmitting the UsBW_Group_U message (step S109). After having received the UsBW_Group_U message for indicating the leave from the group, the OLT 1311 transmits a corresponding ACK message (step S110), then updating the bandwidth contract table (step S111). After that, the OLT 1311 allocates the bandwidth to the ONU 1312 in the individual contract again (step S112).

Figure 13:
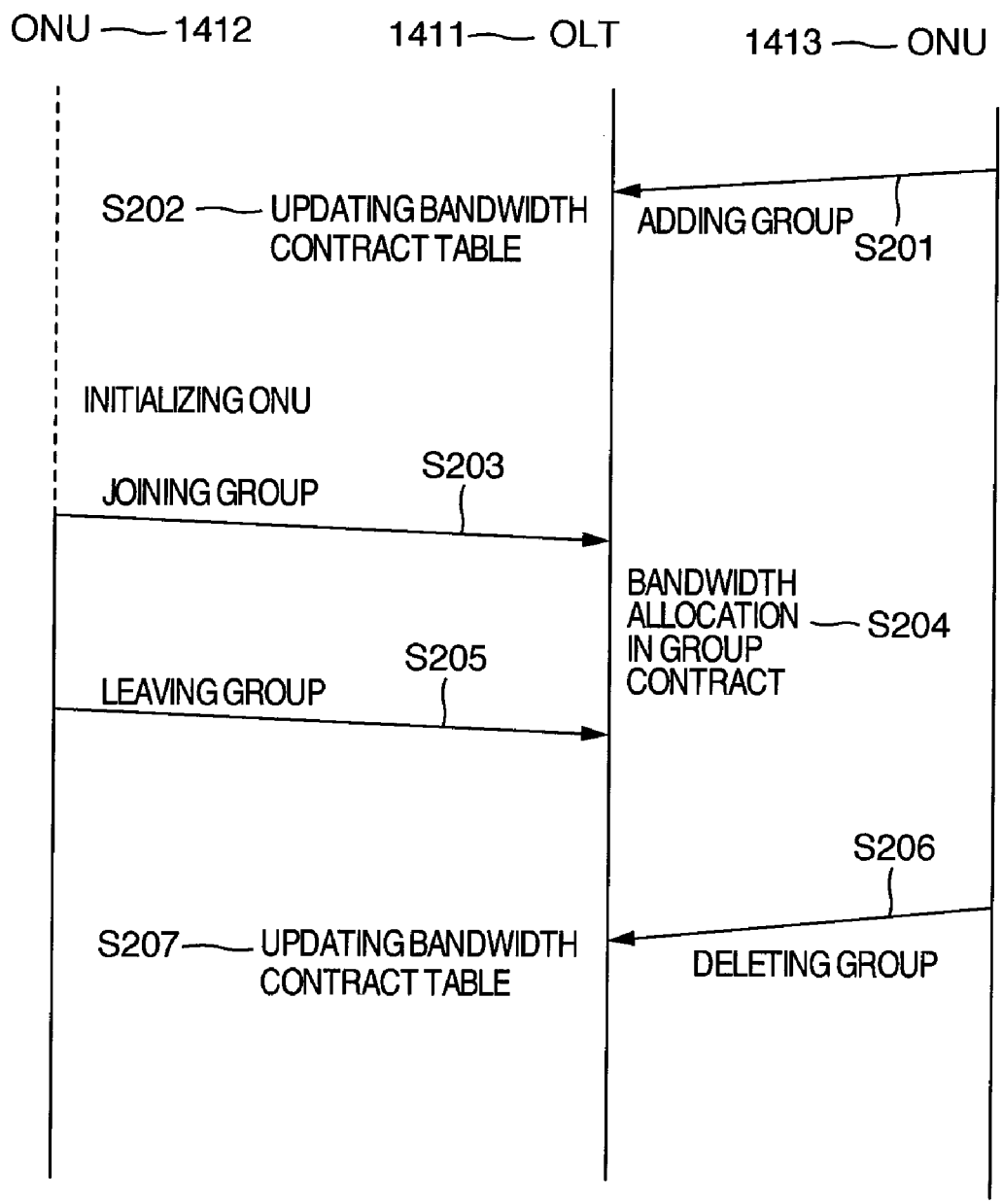
FIG. 13 is a flow diagram for illustrating a process of the addition/deletion of a user group by user and its bandwidth allocation according to the first embodiment of the present invention.

FIG. 13 is a flow diagram for illustrating a process of the addition/deletion of a user group by user and the corresponding bandwidth allocation. In FIG. 13, the explanation will be given below, selecting operations of an OLT 1411 and an ONU 1412 and an ONU 1413 as the example. First, when a user newly creates a group service, the ONU 1413 checks a VLAN-ID (: Virtual Local-Area-Network Identifier), thereby finding out information on the new group. Moreover, the ONU 1413 transmits the UsBW_Group_M message to the OLT 1411 (refer to the message configuration in FIG. 7), thereby notifying the OLT 1411 of the message to which the one group is added and the contract parameters (FB, AB, and GBL) corresponding to the new group (step S201). Having received the UsBW_Group_M message, the OLT 1411 updates the corresponding bandwidth contract table in accordance with the contents of the message (step S202, refer to a detailed table structure in FIG. 19). When the user requests to join this group, the corresponding ONU 1412 transmits the UsBW_Group_M message to the OLT 1411, thereby notifying the OLT 1411 of the join into the group by the user (step S203). Here, the ONU 1412 and the ONU 1413 may be the same ONU, or may be different ONUs. After that, the OLT 1411 allocates the bandwidth to the ONU 1412 in the group contract (step S204, refer to the detailed flow diagram in FIG. 16). The OLT 1411 maintains communications with the ONU 1412 in the group contract until the OLT 1411 has received the UsBW_Group_U message for notifying the leave from the group (step S205). After all users have left the group, when the ONU 1413 notifies the OLT 1311 of deletion of the group by transmitting the UsBW_Group_M message thereto (step S206), the OLT 1411 updates the bandwidth contract table (step S207). Also, when the OLT 1411 receives the UsBW_Group_M message, if a user still exists in the group, the OLT 1411 neglects the UsBW_Group_M message for indicating the deletion.

Hereinafter, referring to FIG. 11, FIG. 14, FIG. 15, and FIG. 16, the explanation will be given below concerning the UsBW_MS message processing in the group bandwidth allocation of the OLT 11 and operation process of the group bandwidth allocation according to the present invention.

Figure 11:
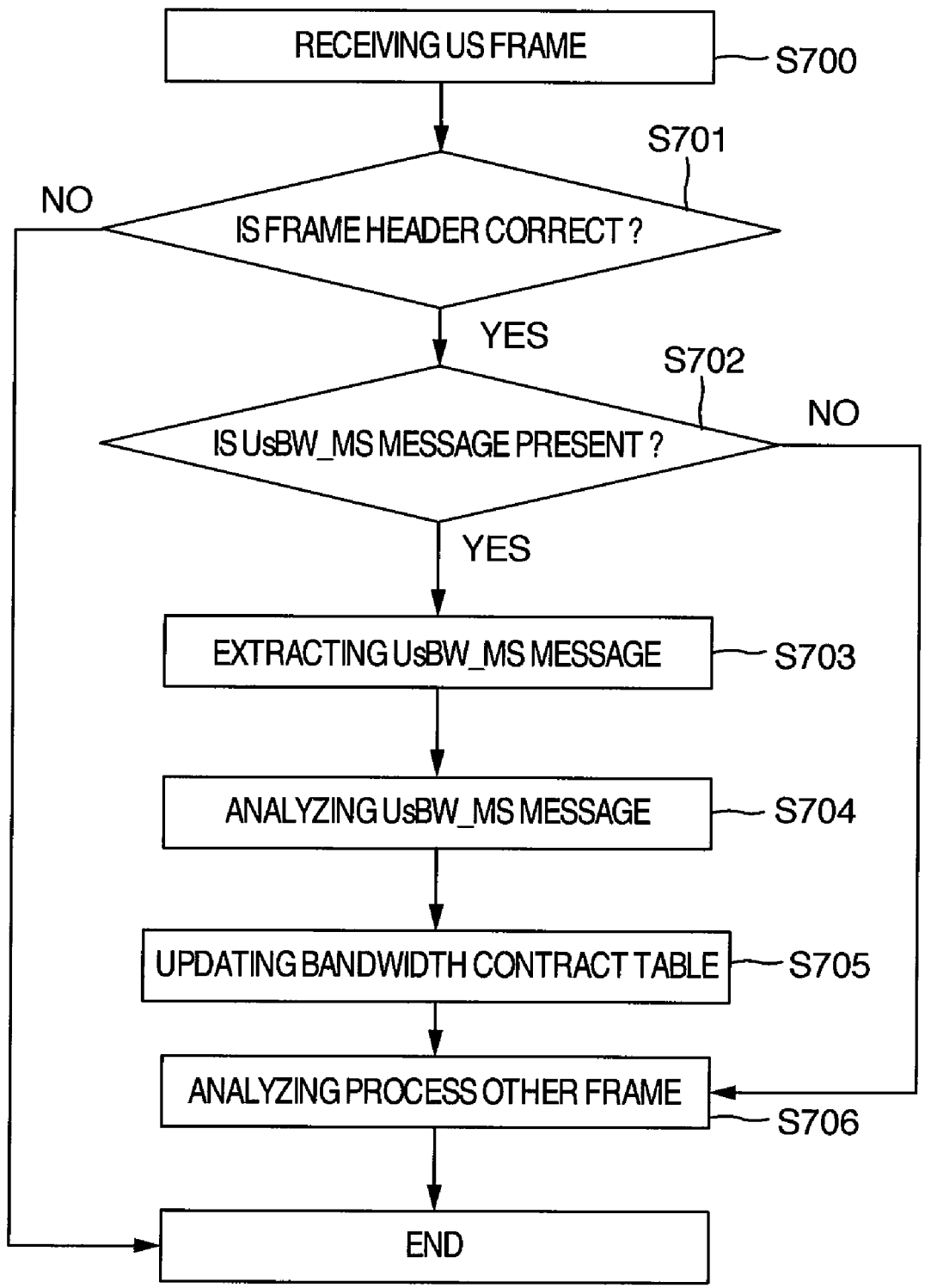
FIG. 11 is a flow diagram for illustrating a process in which the OLT extracts the UsBW_MS message out of an US (: upstream) frame, and analyzes information included in the UsBW_MS message according to the first embodiment of the present invention.

FIG. 11 is a flow diagram for illustrating a process in which the OLT 11 extracts the UsBW_MS message out of an US (: upstream) frame, and analyzes information included in the UsBW_MS message. At a step S700, the OLT 11 receives the US frame from an ONU 12, then judging whether or not the frame header is correct (step S701). As a result of the judgment at the step S701, if the frame header is not correct, the OLT 11 terminates the operation. Meanwhile, if the frame header is correct as a result of the judgment at the step S701, the OLT 11, further, judges whether or not the UsBW_MS message is present in the US frame (step S702). If the UsBW_MS message is present therein, such as, e.g., the UsBW_Group_U, the UsBW_Group_M, or the UsBW_UAmtC_U (refer to the detailed message configurations in FIG. 6, FIG. 7, and FIG. 8), the OLT 11 extracts the UsBW_MS message out of the US frame (step S703). Then, the OLT 11 analyzes the UsBW_MS message that it has received (step S704, the detailed process will be explained below, referring to FIG. 15). Moreover, the OLT 11, depending on the analysis result, updates the bandwidth contract table stored in the memory 115 (step S705). Meanwhile, if, at the step S702, it has been judged that the UsBW_MS message is absent, the OLT 11 directly jumps to a process of analyzing another frame (step S706, refer to Non-Patent Document: ITU-T G. 984. 3).

Figure 14:
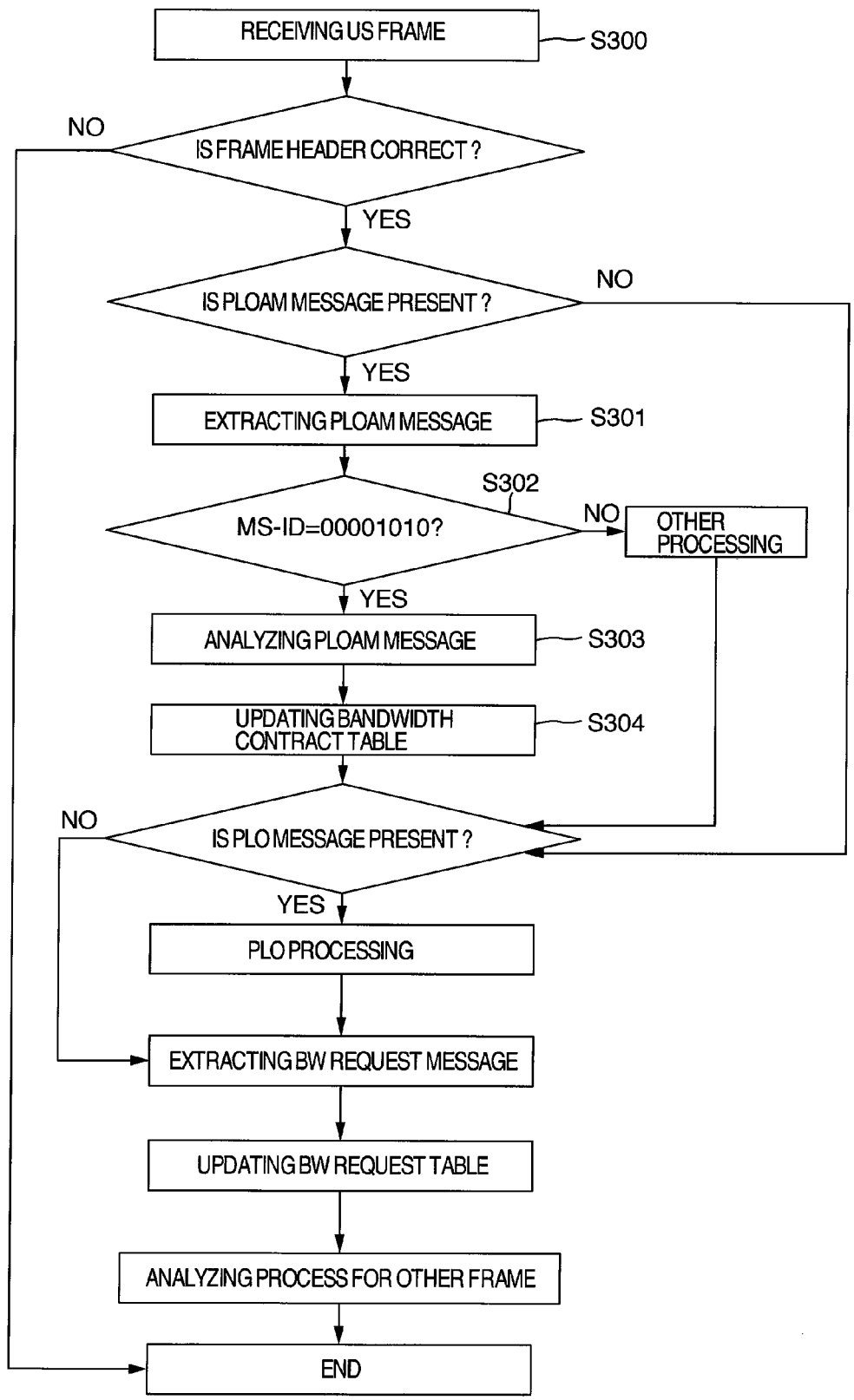
FIG. 14 is a flow diagram for illustrating a process in which the OLT extracts the UsBW_Group_U message out of PLOAM (: Physical Layer Operations, Administration and Maintenance) of the US frame, and processes the UsBW_Group_U message according to the first embodiment of the present invention.

FIG. 14 is a flow diagram for illustrating a process in which the OLT 11 extracts the UsBW_Group_U message out of the PLOAM of the US frame, and processes the UsBW_Group_U message. First, the OLT 11 receives the US frame (step S300), then judging whether or not the frame header is correct. As a result of the judgment, if the frame header is not correct, the OLT 11 terminates the operation. Meanwhile, if the frame header is correct as a result of the judgment, the OLT 11, further, judges whether or not the PLOAM message is present in the US frame. If the PLOAM message is present therein, the OLT 11 extracts the PLOAM message out of the frame header (step S301). After that, the OLT 11 checks the MS-ID, thereby judging whether or not the PLOAM message that it has received is the UsBW_Group_U message (step S302). If the judgment result at the S302 is found to be "Yes", the OLT 11, subsequently, analyzes the UsBW_Group_U message (step S303, the detailed process will be explained referring to FIG. 15), then updating the bandwidth contract table (step S304). Meanwhile, if the judgment result at the S302 is found to be "No", the OLT 11 directly proceeds to a process of analyzing another PLOAM processing (refer to Non-Patent Document: ITU-T G. 984. 3).

Figure 15:
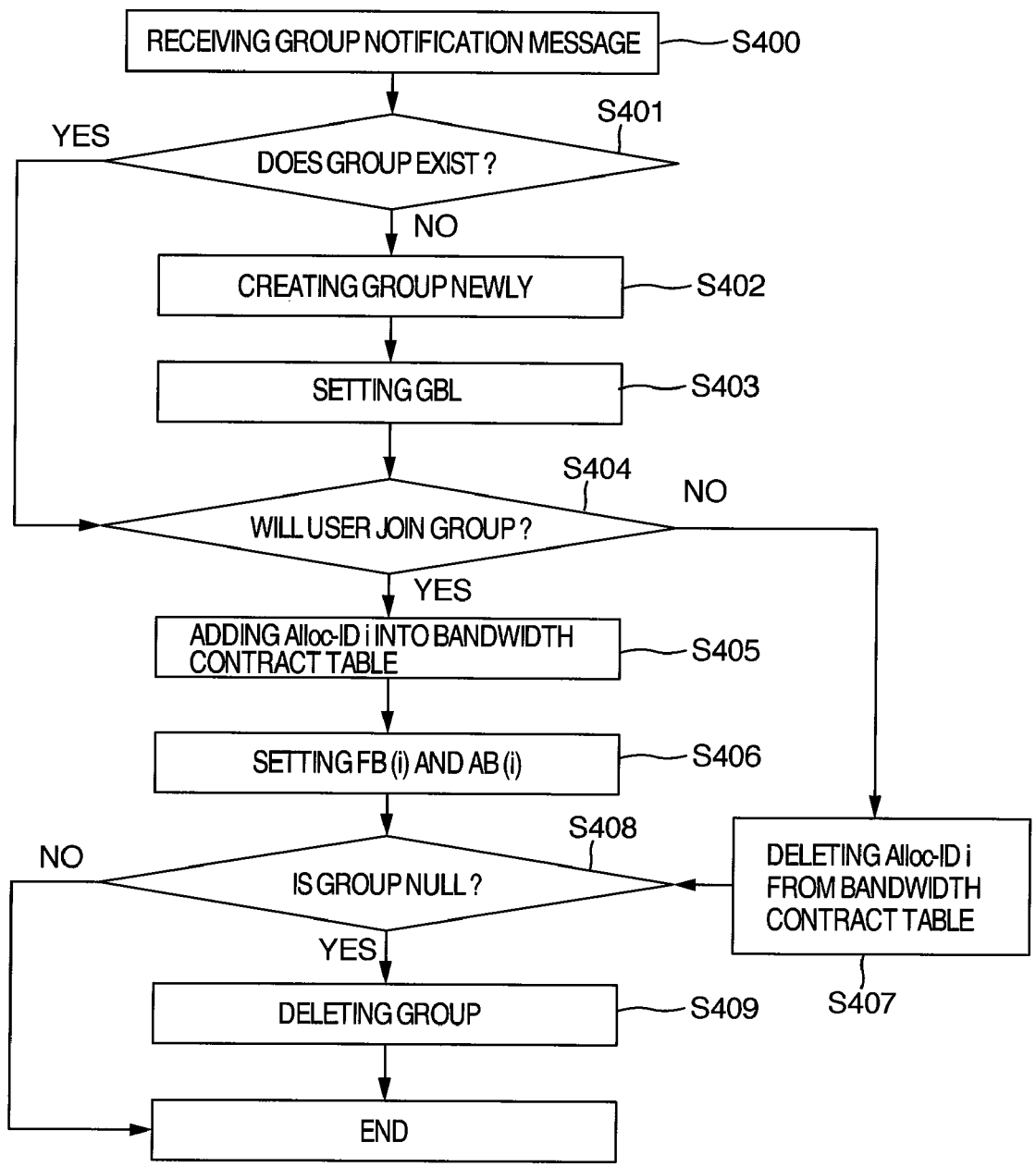
FIG. 15 is a flow diagram for illustrating the OLT operation at the time when the UsBW_Group_U message is received according to the first embodiment of the present invention.

FIG. 15 is a flow diagram for illustrating the OLT operation at the time when the UsBW_Group_U message is received (step S400). When the reception of the UsBW_Group_U message is confirmed, first, the OLT 11 judges whether or not the group exists (step S401). If the group exists, the OLT 11 directly proceeds to a step S404. Meanwhile, if the group does not exist, the OLT 11 creates the group as a novel group (step S402). Then, after setting the group bandwidth limitation at an individual bandwidth limitation of the user (step S403), the OLT 11 proceeds to the step S404. If the group exists (i.e., "Yes" at the step S401), or if the OLT 11 has already set the bandwidth limitation (i.e., the step S403), the OLT 11 checks whether or not the received message is a join notification (step S404). If the check result at the S404 is "Yes", the OLT 11 adds the Alloc-ID of the received message into the bandwidth contract table (step S405). Moreover, the OLT 11 sets the corresponding FB and AB by the copy from the individual contract table (step S406), then proceeding to a step S408. Meanwhile, if the check result at the S404 is "No", since the OLT 11 has received the message for indicating the leave from the group, the OLT 11 deletes the Alloc-ID of the corresponding group (step S407), then proceeding to the step S408. After that, the OLT 11 checks whether or not the group is NULL (i.e., empty) (step S408). If the group is not the NULL group, the OLT 11 terminates the operation. Meanwhile, if the group is the NULL group, the OLT 11 deletes the group (step S409), then terminating the operation. Here, NULL denotes an empty group where no member exists.

Figure 16:
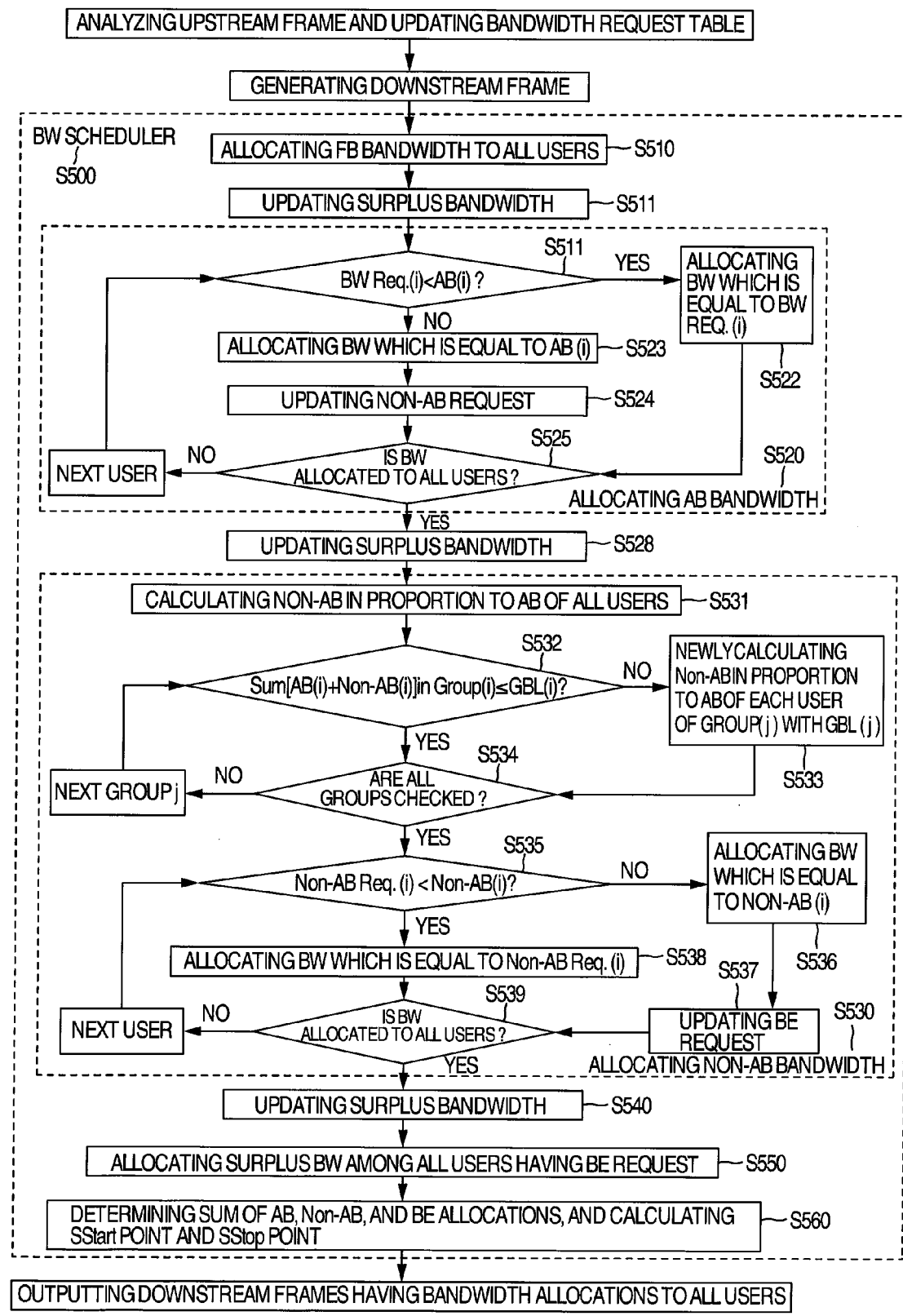
FIG. 16 is a flow diagram for illustrating the group bandwidth-allocating algorithm of the OLT according to the first embodiment of the present invention.

Hereinafter, referring to a flow diagram in FIG. 16, the detailed explanation will be given below concerning the process at the step S106 and the step S204. FIG. 16 is the flow diagram for illustrating the group bandwidth-allocating algorithm performed by the OLT 11. A step S500 indicates manipulations by the bandwidth scheduler 1141 of the OLT 11. First, after generating the downstream frame, at a step S510, the bandwidth scheduler 1141 allocates the FB bandwidth to all users. Subsequently, at a step S520, the bandwidth scheduler 1141 allocates the AB bandwidth to all the users. Here, at the step S520, first, the OLT 11 judges whether or not the present BW Req. (i) of a user (i is an integer) is smaller than a contract parameter AB (i) (step S521). If the BW Req. (i) is smaller than the AB (i), the OLT 11 allocates a bandwidth which is equal to the BW Req. (i) (step S522). Meanwhile, if the BW Req. (i) is not smaller than the AB (i), the OLT 11 allocates a bandwidth which is equal to the AB (i) (step S523). Then, the OLT 11 proceeds to a step S524, updating a Non-AB request to the value of (BW Req. (i)−AB (i)). Moreover, the OLT 11 proceeds to a step S525, then judging whether or not the allocation has been performed to all the users. If the judgment result is found to be "No" at the step S525, the OLT 11 performs an increment to i to jump up to the step S521, then subsequently performing the bandwidth allocation to the next user. In this way, the OLT 11 repeats the loop ranging from the step S521 to the step S525 until the judgment result at step S525 has been found to be "Yes". After having allocated the AB bandwidth to all the users (i.e., "Yes" at the step S525), the OLT 11 proceeds to a step S526, then updating the surplus bandwidth and allocating the Non-AB (step S530). The group bandwidth-allocating algorithm performed until the step S530 here is basically the same as the bandwidth-allocating algorithm in the conventional individual contract. What is more, if it can be confirmed that the allocation has been performed to all the users in advance, the OLT 11 can directly proceed to the allocation of the Non-AB by omitting the above-described group bandwidth-allocating algorithm.

Next, the explanation will be given below regarding the bandwidth-allocating algorithm at the step S530. At the step S530 at which the OLT 11 will allocate the Non-AB, first, the OLT 11 calculates the Non-AB in proportion to the AB parameter of each user (Non-Patent Document: ITU-T G. 983. 4 Appendix I), thereby determining its result as Non-AB (i) (step S531). After that, the OLT 11 judges whether or not sum of all the AB (i) and all the Non-AB (i) in a Group j (j is an integer) is smaller than group bandwidth limitation GBL (j) of the Group j (step S532). If Sum (AB (i)+Non-AB (i))$|_{(i \in Group\ (j))}$ is found to exceed GBL (j), the bandwidth scheduler 1141 uses the GBL (j) in the Group j as the total bandwidth of the Group j. Moreover, the bandwidth scheduler 1141 newly calculates the Non-AB in proportion to the AB parameter of each user (step S533). If the judgment result at the step S532 is found to be "Yes", at a step S534, the bandwidth scheduler 1141 checks whether or not all the groups have been checked. If the judgment result is found to be "No", the bandwidth scheduler 1141 returns to the step S533, and performs an increment to j, thereby subsequently judging the next group until the judgment result at step S534 has been found to be "Yes".

After having checked all the groups, further, the OLT 11 checks whether or not the present Non-AB Req. (i) updated at the step S524 is smaller than the present Non-AB (i) determined by being calculated at the step S531 to the step S534. If the Non-AB Req. (i) is smaller than the Non-AB (i), the OLT 11 allocates a bandwidth which is equal to the request Non-AB Req. (i) (step S538). Meanwhile, if the Non-AB Req. (i) is not smaller than the Non-AB (i), the OLT 11 allocates a bandwidth which is equal to the Non-AB (i) (step S536). Then, the OLT 11 updates a BE request to the value of (Non-AB Req. (i)−Non-AB (i)) (step S537). Similarly, the OLT 11 proceeds to a step S539, then judging whether or not the allocation has been performed to all the users. If the judgment result is found to be "No", the OLT 11 performs an increment to i to jump up to the step S535, then subsequently performing the bandwidth allocation to the next user. The OLT 11 repeats the loop ranging from the step S535 to the step S539 until the judgment result at step S539 has been found to be "Yes". After having allocated the Non-AB to all the users (i.e., "Yes" at the step S539), the OLT 11 terminates the step S530, then updating the surplus bandwidth (step S540). After that, at a step S550, the OLT 11 allocates the BE, i.e., the OLT 11 can allocate the surplus BW among all the users which have the BE request. After having performed all the bandwidth allocations, the OLT 11 determines sum of the allocations in accordance with the ordinary algorithm, thereby calculating the bandwidth grant (step S560). Finally, the OLT 11 outputs, to each user, the downstream frame having the bandwidth allocation.

Technicians (those skilled in the art) of the present field are sure to find it possible to further optimize the bandwidth allocation by using the above-described judgment steps. No influence, however, will be exerted on carry-out of the present invention even if part of the judgment steps is omitted. Also, regarding the judgment order of the respective judgment steps in the present invention, the explanation has been given in accordance with the order commonly used. Nevertheless, it can be understood that modifying the prior-and-subsequent order of the judgment steps is allowable.

In the first embodiment of the present invention, at the step S532, not the bandwidth of each user but the sum of the bandwidth of the group has been checked/limited using the GBL. This feature assures that the users in the same group can dynamically share the maximum bandwidth/bandwidth limitation, thereby making it possible to prevent the bandwidth allocated to the users in the same group from exceeding the GBL of the group.

2ND EMBODIMENT

The configuration and its connection of each ONU and the OLT in a second embodiment are similar to those in the first embodiment. Accordingly, similar reference numerals are assigned to similar configuration components to those in the first embodiment, and the detailed explanation thereof will be omitted.

Figure 3:
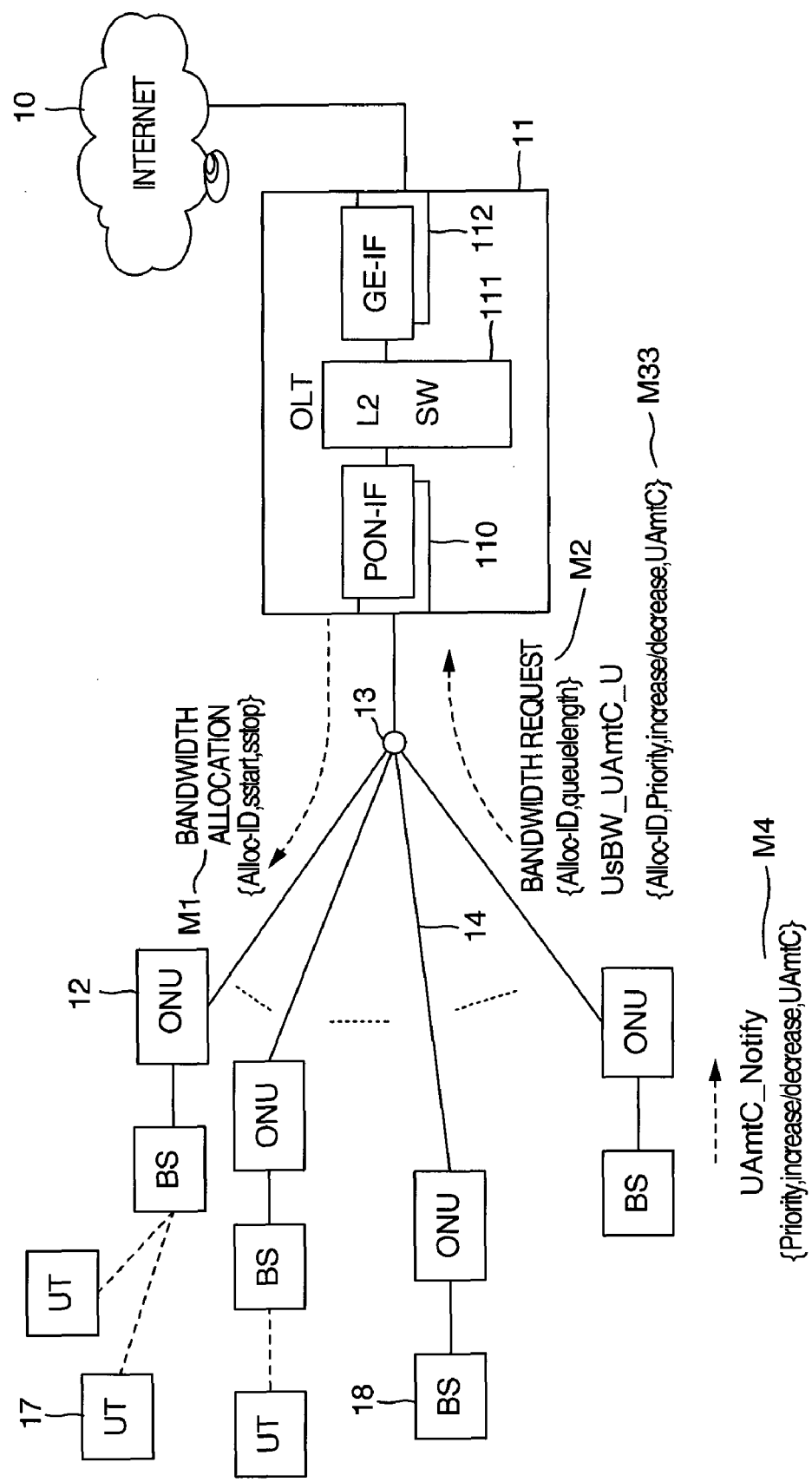
FIG. 3 is a principle diagram for illustrating the PON system having a user-amount change notification according to a second embodiment of the present invention.

Hereinafter, referring to FIG. 3, the explanation will be given below concerning a different point between the second embodiment and the first embodiment of the present invention. FIG. 3 is a principle diagram for illustrating the PON system having a user-amount change notification. In FIG. 3, the PON system includes the OLT 11, each ONU 12, and user terminals 17. Here, the OLT 11 includes the PON-IF 110, the L2SW 111, and the GE-IF 112 connected to the Internet 10. The user terminals 17 are connected to BSs (: Base Stations) 18. Each ONU 12 is connected to the OLT 11 via the tree-topology optical splitter 13 and each optical fiber 14. Each BS 18 is connected to each ONU 12.

The OLT 11 transmits, in the downstream direction, the bandwidth-allocating message M1 to each ONU 12, thereby making it possible to allocate a bandwidth thereto. Each ONU 12 transmits, in the upstream direction, the bandwidth-requesting message M2 to the OLT 11 via the optical splitter 13 and each optical fiber 14, thereby making it possible to request an UsBW_UAmtC_U message M33. The message M33 is transmitted when a UAmtC_Notify message for indicating a user-amount change in the user terminals 17 is received from each BS 18 as a bandwidth and user-amount change notification.

Figure 8:
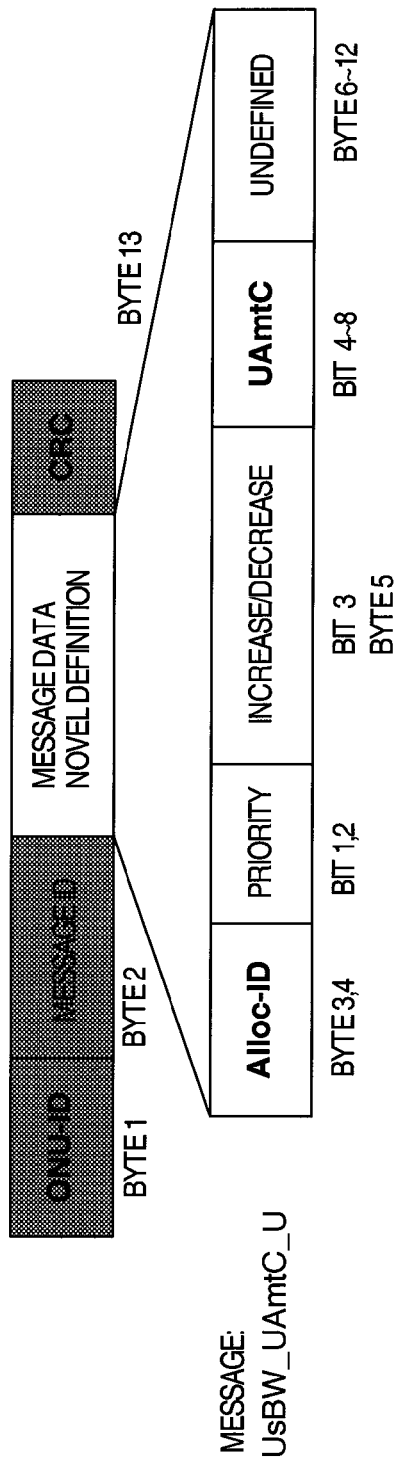
FIG. 8 is a frame configuration diagram for illustrating an UsBW_UAmtC_U message from each ONU to the OLT according to the second embodiment of the present invention.

FIG. 8 is a frame configuration diagram for illustrating the UsBW_UAmtC_U message. In particular, the UsBW_UAmtC_U message includes Alloc-ID (2 bytes) for identifying the user connection, priority (2 bits) for identifying priority of a change UT, increase/decrease (1 bit) for identifying an increase/decrease in the user amount, the UAmtC (: user-amount change, 5 bits) for identifying the user-amount change under one base station 18, and 7-byte patch, thus becoming equal to 10-byte length in total.

Figure 9:
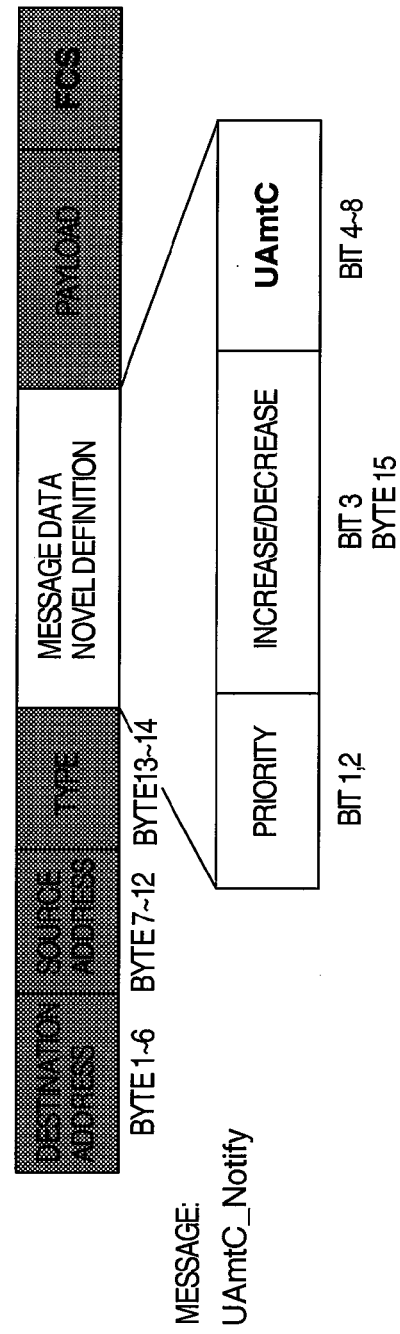
FIG. 9 is a frame configuration diagram for illustrating a UAmtC_Notify message from the BS to each ONU according to the second embodiment of the present invention.

FIG. 9 is a frame configuration diagram for illustrating the UAmtC_Notify message. The UAmtC_Notify message, which is 1 byte in length, can be integrated into an Ethernet frame from each BS 18 to each ONU 12. In particular, the UAmtC_Notify message includes the priority (2 bits) for identifying the priority of a change UT, the increase/decrease (1 bit) for identifying an increase/decrease in the user amount, and the UAmtC (5 bits) for identifying the user-amount change under one base station 18, thus becoming equal to 1-byte length in total.

In the second embodiment, each ONU 12 establishes a connection to each BS 18, thereby making it possible to define the UsBW_UAmtC_U message M33 from each BS 18 as the UsBW_MS message, and to perform the process illustrated in FIG. 11 in the first embodiment. This feature makes it possible to allocate the group bandwidth rationally.

3RD EMBODIMENT

Figure 17:
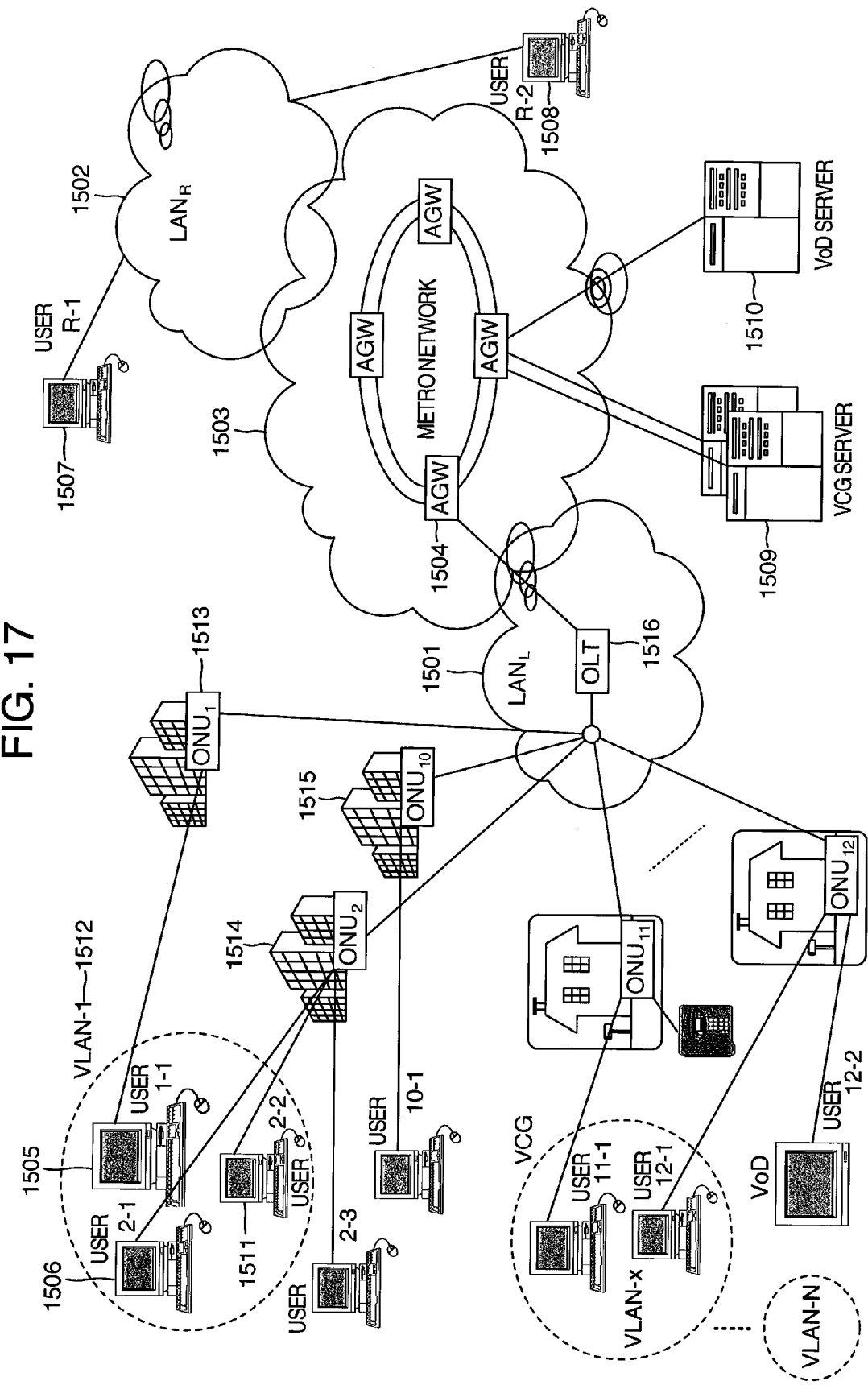
FIG. 17 is a flow diagram for illustrating VCG (Video Conference Group) service in a local PON network of the group bandwidth allocation according to a third embodiment of the present invention, and a metro network to which its connection is applied.

FIG. 17 is a flow diagram for illustrating VCG (: Video Conference Group) service in a local PON network of the above-described group bandwidth allocation according to a third embodiment of the present invention, and a metro network to which its connection is applied.

Here, users are connected to a LAN (: Local Area Network)$_L$ 1501 and a LAN$_R$ 1502 via wired access lines. Moreover, both of the LANs are connected to a metro network 1503 via AGWs (: Access Gateways) 1504. Accordingly, local users (e.g., user 1-1 1505, user 2-1 1506, and so on) can communicate with remote users (e.g., user R-1 1507, user R-2 1508, and so on) by taking advantage of the VCG service based on a VCG server 1509, or can take advantage of VoD (: Video-on-Demand) service based on a VoD server 1510. Each user terminal corresponds to its own T-CONT used for the bandwidth allocation of the PON section.

The local users are classified into business users that use optical fibers to buildings (FTTB: Fiber-To-The-Building) and resident users that use optical fibers to homes (FTTH: Fiber-To-The-Home). The users that will take advantage of a similar VCG service join one and the same VLAN (: Virtual LAN). Simultaneously, the other users join another VLAN, or maintain the independence. For example, the user 1-1 1505, the user 2-1 1506, and a user 2-2 1511 join a VLAN-1 1512. After the user 1-1 1505, the user 2-1 1506, and the user 2-2 1511 have joined the VLAN-1 1512, an ONU 1 1513, an ONU 2 1514, and an ONU 10 1515 create a group by transmitting the UsBW_Group_M message to an OLT 1516, and join the group by transmitting the UsBW_Group_U message to the OLT 1516. This allows the OLT 1516 to allocate a bandwidth grant based on the group contract of the VLAN-1 1512. Also, taking advantage of the VCG service allows the user 1-1 1505, the user 2-1 1506, and the user 2-2 1511 to dynamically share the maximum bandwidth/bandwidth limitation. If any one of the user 1-1 1505, the user 2-1 1506, and the user 2-2 1511 requests a leave from the VLAN-1 1512, the corresponding ONU can terminate the group bandwidth allocation by transmitting the UsBW_Group_U message to the OLT 1516.

FIG. 18 exemplifies a bandwidth request table of the OLT 11. This bandwidth request table is applicable to each of the other embodiments similarly. In FIG. 18, T-CONT identifier (Alloc-ID) is used for the group bandwidth allocation of the PON section. T-CONT type denotes type of correspondence defined by ITU-T Standard G. 984. 3. Group-ID denotes which group a user has joined. The right two columns denote queue lengths of traffics of FB and AB+Non-AB+BE, respectively. In the bandwidth request table of the OLT 11, instead of Alloc-ID and T-CONT type used for GPON in particular, another identifier and type parameter for connection can also be used. For example, in EPON, the user connection is explained using LLID (: Logical Link Identifier). In FIG. 18, T-CONTs 0x2, 0x3, and 0x5 are used by the user 1-1 1505, the user 2-1 1506, and the user 2-2 1511, respectively. T-CONT types corresponding to T-CONTs 0x1, 0x2, 0x3, 0x4, 0x5, and 0x6 are Type 1, Type 3, Type 3, Type 3, Type 3, and Type 5, respectively (Non-Patent Reference Document: ITU-T G. 984. 3). FB queue lengths corresponding to T-CONTs 0x1, 0x2, 0x3, 0x4, 0x5, and 0x6 are 5k, 0, 0, 0, 0, 3k, respectively. Non-FB queue lengths (i.e., queue length of AB+Non-AB+ BE) corresponding to T-CONTs 0x1, 0x2, 0x3, 0x4, 0x5, and 0x6 are 0, 20 k, 15000 k, 41000k, 50 k, and 20000 k, respectively. Group-IDs corresponding to T-CONTs 0x2, 0x3, and 0x5 are 200, which indicates that these three T-CONTs have joined the same VCG group. Also, T-CONT 0x4 joins a group 201, and T-CONTs 0x1 and 0x6 are processed as individual users without joining any group.

FIG. 19 is a diagram for illustrating the bandwidth request table for recording the group contract parameters in the OLT 1516. This bandwidth request table is applicable to each of the other embodiments similarly. In FIG. 19, the meanings of Group-ID and T-CONT are basically the same as those in FIG. 18. The group contract parameters FB, AB, and GBL (:group bandwidth limitation) specify fixed bandwidth, assured bandwidth, and bandwidth limitation of the group used for the bandwidth allocation (refer to the allocation flow diagrams in FIG. 15 and FIG. 16). Here, T-CONTs 0x2, 0x3, and 0x5 have their own FB/AB parameters, and share a similar GBL. The GBL is used for the group bandwidth allocation by the OLT 1516, thus causing T-CONTs 0x2, 0x3, and 0x5 to dynamically co-use the maximum bandwidth/bandwidth limitation.

4TH EMBODIMENT

Figure 20:
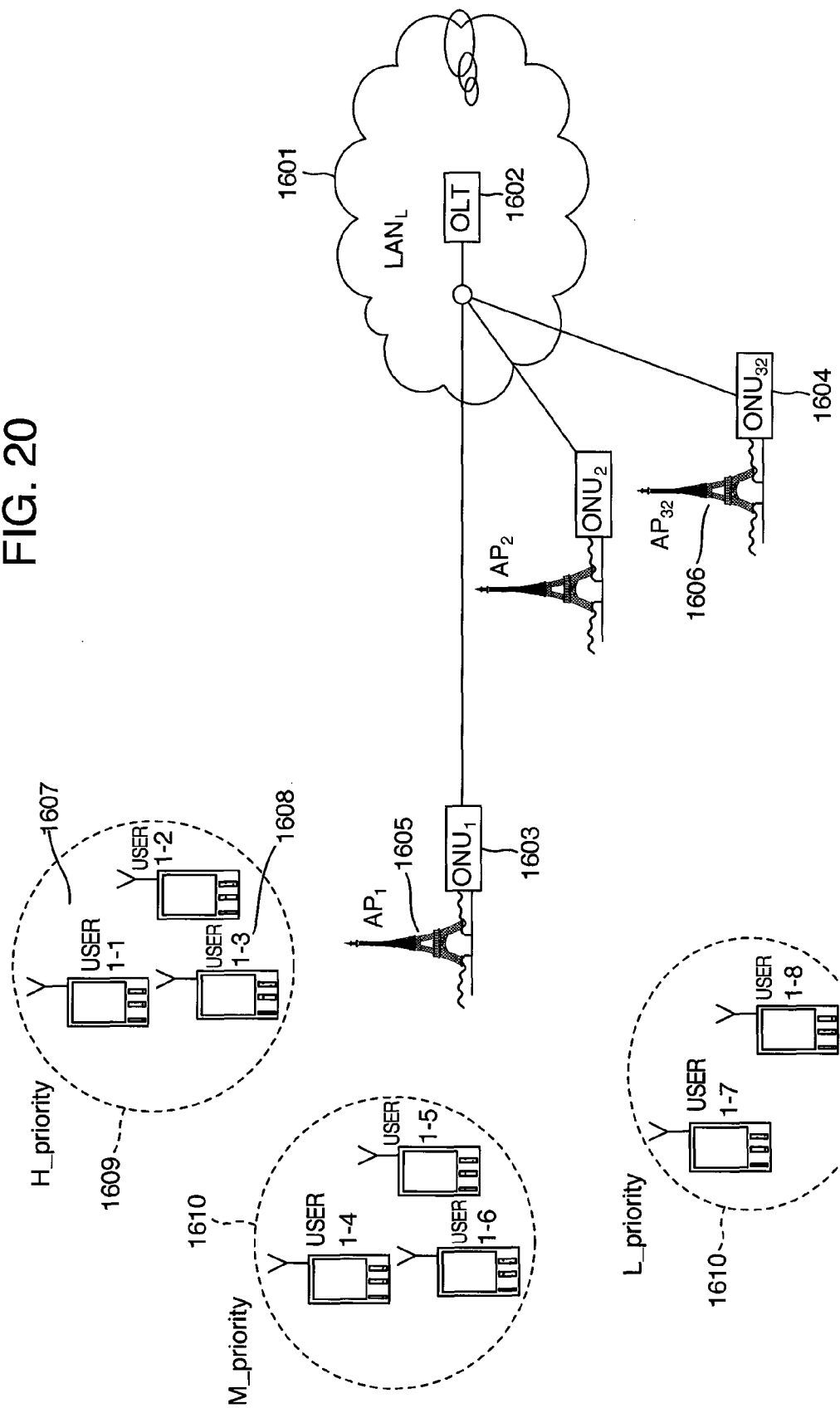
FIG. 20 is a schematic diagram for illustrating a wireless access network connected to each ONU which is capable of receiving the UAmtC_Notify message from an AP (: Access Point), and transmitting the UsBW_UAmtC_U message to the OLT according to a fourth embodiment of the present invention.

FIG. 20 illustrates a wireless access network connected to each ONU which is capable of receiving the UAmtC_Notify message from an AP (: Access Point), and transmitting the UsBW_UAmtC_U message to the OLT according to a fourth embodiment of the present invention.

Here, in a LAN L 1601, 32 ONUs (e.g., ONU 1 1603 and ONU 32 1604) are connected to an OLT 1602. Moreover, APs (e.g., AP 1 1605 and AP 32 1606) are connected via these ONUs. Mobile users (e.g., user 1-2 1607 and user 1-3 1608) are connected to the LAN L 1601 via wireless aerial interface and the PON system. T-CONT of each user terminal corresponds thereto, and is used for the bandwidth allocation of the PON section. Based on a contract set in advance, the users are classified into H_priority 1609, M_priority 1610, and L_priority 1611. Each AP reports a change in the user amount of each priority to each ONU by transmitting the UAmtC_Notify message. Each ONU reports this message to the OLT by transmitting the UsBW_UAmtC_U message. For example, when the user 1-2 1607 and user 1-3 1608 have displaced from the cover area of the AP 32 1606 to the cover area of the AP 1 1605, the AP 1 1605 and the AP 32 1606 transmit the UAmtC_Notify message to the ONU 1 1603 and the ONU 32 1604 of their own, thereby notifying that the user amount of H_priority 1609 has increased/decreased by two. Meanwhile, the ONU 1 1603 and the ONU 32 1604 transmit the UsBW_UAmtC_U message to the OLT 1602, thereby notifying that the user amount of H_priority 1609 has increased/decreased by two. Accordingly, the OLT 1602 updates the bandwidth contract table (refer to a detailed data configuration in FIG. 21), then allocating the bandwidth to the ONU 1 1603 and the ONU 32 1604 based on the new bandwidth contract. The use of the UsBW_UAmtC_U message allows the OLT 1602 to acquire the dynamical change information on the mobile users with respect to each ONU. Consequently, the OLT 1602 finds it possible to allocate the bandwidth effectively.

FIG. 21 illustrates a bandwidth contract table for recording the user amount of each priority in the OLT. In FIG. 21, T-CONTs are used for the bandwidth allocation of the PON section. Priority level denotes priority level of each T-CONT, and UAmt (: User Amount) denotes the user amount in each T-CONT. The bandwidth contract parameters FB, AB, and bandwidth limitation specify fixed bandwidth, assured bandwidth, and bandwidth limitation used for the bandwidth allocation. Here, T-CONTs 0x1, 0x2, and 0x3 have their own FB/AB/bandwidth limitation used for the bandwidth allocation each.

In the foregoing description, based on the drawings and the concrete embodiments, the detailed explanation has been given concerning some of the embodiments of the present invention. The present invention, however, is not limited to these embodiments. It is of course possible to devise the various variations as long as they do not deviate from the invention idea of the present invention.

For example, the UsBW_MS message is not limited to the above-described several concrete types. Namely, as long as a message is a one for indicating a supply/demand variation in the service quality in the bandwidth allocation, the message can be defined and used as a one to be notified to the OLT.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical line terminal connected to a plurality of optical network units, comprising:
   a memory unit which stores a bandwidth contract table for indicating a correspondence relationship between group IDs for identifying each of a plurality of groups, each group respectively including a plurality of user terminals, user IDs for identifying each user terminal, and group contract bandwidths of each group,
   wherein each of the plurality of user terminals is connected to a respective optical network unit of the plurality of optical network units, and
   wherein each group contract bandwidth includes a fixed bandwidth value for each user terminal, an assured bandwidth value for each user terminal, and a value of a group bandwidth limitation for each group;
   a receiving unit which receives a bandwidth request from one of the optical network units;
   a control unit,
   wherein the control unit:
   allocates bandwidth to each user terminal based on the bandwidth request, the fixed bandwidth value, and the assured bandwidth value of the group contract bandwidth;
   calculates a first non-assured bandwidth value of each user terminal, which has not allocated all of the requested bandwidth, in proportion to the assured bandwidth value of each user terminal;
   compares the sum of the allocated assured bandwidth value and the first non-assured bandwidth value for the group with the value of the group bandwidth limitation of the group; and
   when the sum of the allocated assured bandwidth value and the first non-assured bandwidth value for the group exceeds the value of the group bandwidth limitation of the group, recalculates and allocates a second non-assured bandwidth value of each user terminal of the exceeded group in proportion to the assured bandwidth value of each user terminal such that the sum of the allocated assured bandwidth value and the second non-assured bandwidth value for the group is equal to the value of the group bandwidth limitation of the group; and a sending unit which sends downstream data including the sum of the allocated fixed bandwidth value, the allocated assured bandwidth value, and the second allocated non-assured bandwidth value for each user terminal to the optical network units.

2. The optical line terminal according to claim 1, further comprising:

a network interface for receiving a service-quality request message from each optical network unit connected to said optical line terminal, said service-quality request message including each communication flow ID for identifying each communication flow between said optical line terminal and each optical network unit, and service quality parameters, wherein said service quality parameters are group IDs which define one of said communication flows, and a group bandwidth limitation imposed on each group ID, wherein said service-quality request message includes operation IDs which define creation or deletion of a group, and wherein said control unit updates said bandwidth contract table by creating or deleting said group, based on said operation IDs included in said service quality parameters.

3. The optical line terminal according to claim 1, further comprising:

a network interface for receiving a service-quality request message from each optical network unit connected to said optical line terminal, said service-quality request message including each communication flow ID for identifying each communication flow between said optical line terminal and each optical network unit, and service quality parameters, wherein said service quality parameters are group IDs which define one of said communication flows, and a group bandwidth limitation imposed on each group ID, wherein said service-quality request message includes group IDs and operation IDs each of which defines join/leave into/from a group, and wherein said control unit updates said bandwidth contract table by adding or deleting said communication flow specified by said communication flow ID within said group IDs, based on said group IDs and said operation IDs included in said service quality parameters.

4. The optical line terminal according to claim 1, further comprising:

a network interface for receiving a service-quality request message from each optical network unit connected to said optical line terminal, said service-quality request message including each communication flow ID for identifying each communication flow between said optical line terminal and each optical network unit, and service quality parameters, wherein said service quality parameters are group IDs which define one of said communication flows, and a group bandwidth limitation imposed on each group ID, wherein said service-quality request message includes a communication priority, and wherein a plurality of terminals, in said communication priority, perform communications with said optical line terminal by the same communication flow ID and bandwidth limitation.

5. The optical line terminal according to claim 4, wherein said service-quality request message includes operation IDs which define an increase or decrease in the number of said plurality of terminals, and wherein said control unit updates said bandwidth contract table by increasing or decreasing said number of said plurality of terminals corresponding to said communication flow IDs and said communication priority, based on said operation IDs included in said service quality parameters.

6. The optical line terminal according to claim 1, wherein the control unit, upon receiving a group join request from one of the plurality of user terminals, and upon determining a requested group is not included in the bandwidth contract table, sets an individual bandwidth limitation of the one of the plurality of user terminals to the value of the group bandwidth limitation of the requested group.

7. A bandwidth-allocating method of allocating a bandwidth from an optical line terminal to a plurality of optical network units, said optical line terminal having a memory unit, a receiving unit, a control unit and a sending unit, said bandwidth-allocating method, comprising the steps of:

storing, by the memory unit, a bandwidth contract table for indicating a correspondence relationship between group IDs for identifying a each of a plurality of groups, each group respectively including plurality of user terminals, user IDs for identifying each user terminal, and group contract bandwidths of each group, wherein each of the plurality of user terminals is connected to a respective optical network unit of the plurality of optical network units, and wherein each group contract bandwidth includes a fixed bandwidth value for each user terminal, an assured bandwidth value for each user terminal, and a value of a group bandwidth limitation for each group;

receiving, by the receiving unit, a bandwidth request from one of the optical network units;

allocating, by the control unit, bandwidth to each user terminal based on the bandwidth request, the fixed bandwidth value, and the assured bandwidth value of the group contract bandwidth;

calculating, by the control unit, a first non-assured bandwidth value of each user terminal, which has not allocated all of the requested bandwidth, in proportion to the assured bandwidth value of each user terminal;

comparing, by the control unit, the sum of the allocated assured bandwidth value and the first non-assured bandwidth value for the group with the value of the group bandwidth limitation of the group;

when the sum of the allocated assured bandwidth value and the first non-assured bandwidth value for the group exceeds the value of the group bandwidth limitation of the group, recalculating and allocating, by the control unit, a second non-assured bandwidth value of each the exceeded group in proportion to a requested assured bandwidth value of the user terminal such that the sum of the allocated assured bandwidth and the second non-assured bandwidth value for the group is equal to the value of the group bandwidth limitation of the group; and sending, by the sending unit, downstream data including the sum of the allocated fixed bandwidth value, the allocated assured bandwidth value, and the second allocated non-assured bandwidth value for each user terminal to the optical network units.

8. The bandwidth-allocating method according to claim 7, further comprising:

transmitting a service-quality request message from each optical network unit to said optical line terminal, said service-quality request message including communication flow IDs and service quality parameters, each communication flow ID identifying each communication flow between said optical line terminal and each optical network unit, and wherein said service quality parameters are group IDs which define one of said communication flows, and a group bandwidth limitation imposed on each group ID, wherein said service-quality request message includes operation IDs which define creation or deletion of a group, and wherein said optical line terminal updates said bandwidth contract table by creating or deleting said group, based on said operation IDs included in said service quality parameters.

9. The bandwidth-allocating method according to claim 7, further comprising:

transmitting a service-quality request message from each optical network unit to said optical line terminal, said service-quality request message including said communication flow IDs and said service quality parameters, each communication flow ID identifying each communication flow between said optical line terminal and each optical network unit, and wherein said service quality parameters are group IDs which define one of said communication flows, and a group bandwidth limitation imposed on each group ID, wherein said service-quality request message includes group IDs and operation IDs each of which defines join/leave into/from a group, and wherein said optical line terminal updates said bandwidth contract table by adding or deleting said communication flow specified by said communication flow ID within said group IDs, based on said group IDs and said operation IDs included in said service quality parameters.

10. The bandwidth-allocating method according to claim 7, further comprising:

transmitting a service-quality request message from each optical network unit to said optical line terminal, said service-quality request message including said communication flow IDs and said service quality parameters, each communication flow ID identifying each communication flow between said optical line terminal and each optical network unit, and wherein said service quality parameters are group IDs which define one of said communication flows, and a group bandwidth limitation imposed on each group ID, wherein said service-quality request message includes a communication priority, and wherein a plurality of terminals, in said communication priority, perform communications with said optical line terminal by the same communication flow ID and bandwidth limitation.

11. The bandwidth-allocating method according to claim 7, further comprising:

transmitting a service-quality request message from each optical network unit to said optical line terminal, said service-quality request message including said communication flow IDs and said service quality parameters, each communication flow ID identifying each communication flow between said optical line terminal and each optical network unit, and wherein said service quality parameters are group IDs which define one of said communication flows, and a group bandwidth limitation imposed on each group ID, wherein said service-quality request message includes operation IDs which define an increase or decrease in the number of said plurality of terminals, and wherein said optical line terminal updates said bandwidth contract table by increasing or decreasing said number of said plurality of terminals corresponding to said communication flow IDs and said communication priority, based on said operation IDs included in said service quality parameters.

12. The bandwidth-allocating method according to claim 7, further comprising:

upon receiving a group join request from one of the plurality of user terminals, and upon determining a requested group is not included in the bandwidth contract table, setting, by the control unit, an individual bandwidth limitation of the one of the plurality of user terminals to the value of the group bandwidth limitation of the requested group.

\* \* \* \* \*